United States Patent [19]

Ono et al.

[11] Patent Number: 4,962,469

[45] Date of Patent: Oct. 9, 1990

[54] EXERCISE MEASURING INSTRUMENT

[75] Inventors: Haruo Ono; Satoshi Kinoshita; Fusao Suga, all of Tokyo, Japan

[73] Assignee: Casio Computer Co., Ltd., Tokyo, Japan

[21] Appl. No.: 339,179

[22] Filed: Apr. 14, 1989

[30] Foreign Application Priority Data

Apr. 18, 1988 [JP] Japan .............................. 63-51776[U]
Jun. 15, 1988 [JP] Japan .............................. 63-79116[U]
Oct. 31, 1988 [JP] Japan ............................. 63-142496[U]

[51] Int. Cl.⁵ ............................................. G01C 22/00
[52] U.S. Cl. ..................................... 364/561; 235/105
[58] Field of Search ............... 364/561, 565, 566, 564; 235/105; 272/DIG. 9; 377/24.2; 324/165, 166

[56] References Cited

U.S. PATENT DOCUMENTS

| | | | |
|---|---|---|---|
| 3,797,010 | 3/1974 | Adler et al. ................ | 272/DIG. 9 |
| 4,144,568 | 3/1979 | Hiller et al. ........................ | 364/556 |
| 4,192,000 | 3/1980 | Lipsey ............................ | 364/413.29 |
| 4,220,996 | 9/1980 | Searcy ................................ | 364/561 |
| 4,223,211 | 9/1980 | Allsen et al. ....................... | 377/24.2 |
| 4,387,437 | 6/1983 | Lowrey et al. ..................... | 235/105 |
| 4,466,204 | 8/1984 | Wu .................................... | 235/105 |
| 4,510,704 | 4/1985 | Johnson ............................. | 235/105 |
| 4,571,680 | 5/1982 | Wu ..................................... | 364/561 |
| 4,651,446 | 3/1987 | Yukawa et al. ..................... | 235/105 |
| 4,741,001 | 4/1988 | Ma ..................................... | 364/561 |

FOREIGN PATENT DOCUMENTS 2192475 1/1988 United Kingdom ............... 235/105

Primary Examiner—Parshotam S. Lall
Assistant Examiner—Michael Zanelli
Attorney, Agent, or Firm—Frishauf, Holtz, Goodman & Woodward

[57] ABSTRACT

An exercise measuring instrument according to the present invention employs an acceleration sensor which comprises a piezoelectric piece having a pair of piezoelectric elements stuck to each other. An output waveform of the acceleration sensor is supplied to an amplifier, gain of which is changed in accordance with an exercise mode selected out of a walking mode, an exercise-walking mode and a jogging mode, and thereby an output level of the amplifier is kept at somewhat an equal voltage level, although the voltage level of the output waveform of the acceleration sensor is different between the exercise modes. This improvement allows an accurate measurement of exercise.

34 Claims, 21 Drawing Sheets

EXERCISE MEASURING INSTRUMENT

BACKGROUND OF THE INVENTION

The present invention relates to an exercise measuring instrument in which exercise in walking, jogging, running, and the like is measured utilizing an acceleration sensor which uses a piezoelectric element and the like, and the measured exercise is informed.

Devices such as a pedometer are well known which are used to count the number of steps taken by the user of such devices while he or she is walking or jogging for the health. For example such devices are shown and described in U.S. Pat. Nos. 4,144,568, 4,192,000, 4,223,211 and 4,387,437.

In pedometers described in the above U.S. Pat. Specifications, a magnetic sensor or a mechanical sensor is used as a sensor detecting walking or jogging. This results in a relative complexity in the sensor-construction and thereby the devices are made not only large in size but also are easy to be damaged by an external shock and the like.

While, U.S. Pat. Nos. 4,510,704 and 4,651,446 disclose techniques where pedometers are installed in Boots or shoes in which pedometers a piezoelectric element is used. Though in both the above U.S. Patents an electronic circuit is not concretely disclosed for processing a signal supplied from the piezoelectric element, it is considered that in case an electric signal generated by vibration of the piezoelectric element is relatively small, the electric signal is amplified by an amplifier and the number of steps is calculated by counting points at which a level of the amplified electric signal varies.

By the way, the above-mentioned pedometers using the piezoelectric element are installed in Boots or shoes, but when these pedometers are worn for example on the wrist or the waist of the user of the device, the electric signal generated by the vibration of the piezoelectric element is extremely small, so that an amplifier with a high gain must be employed for accurately detecting the electric signal.

However, the piezoelectric element generates an electrical signal having a certain amplitude when the user is walking, and it also generates another electrical signal having an amplitude greatly different from that of the former signal when the user is jogging. Therefore, there is a disadvantage that if the amplifier is set to a "high gain", the electrical signal generated when the user is walking may be detected while the electric signal generated when the user is jogging cannot be detected, because of the excessively large amplitude of the electrical signal resulting from the high gain of the amplifier. On the other hand, there exists another disadvantage that if the amplifier is set to a "low gain", the electric signal may be detected which is generated when the user is jogging but the signal can not be detected which is generated when the user is walking, because the signal is too small to be detected.

SUMMARY OF THE INVENTION

The present invention has been made in order to overcome the disadvantages stated above. It is an object of the present invention to provide an exercise measuring instrument which is extremely simple in construction and can be used to firmly count exercise in walking and jogging.

In order to achieve the above mentioned object, the present invention is construction as follows:

an exercise measuring instrument comprising: an acceleration sensor to be worn on a body of an exerciser, for outputting a waveform signal representative of an acceleration which is received by said acceleration sensor in response to movements of said exerciser; amplifying means connected to said acceleration sensor for amplifying said waveform signal outputted from said acceleration sensor; selecting means for selecting one exercise mode out of a plurality of exercise modes, each of which represents a type of an exercise performed by said exerciser; amplifier-gain control means connected to said selecting means, for varying the amplifier-gain of said amplifying means in accordance with the exercise mode selected by said selecting means; exercise-measuring means for measuring exercise data in said selected exercise mode on the basis of said waveform signal amplified by said amplifying means; and announcing means for announcing the exercise data measured by said exercise-measuring means.

The present invention constructed as mentioned above, allows to firmly measure exercise in walking, jogging and the like with an extremely simple construction and has a merit that the instrument according to the invention can be made compact in size.

DETAILED DESCRIPTION OF THE PREFERRED EMBODIMENTS

The present invention will concretely be described hereinafter.

(First Embodiment)

Figure 1:
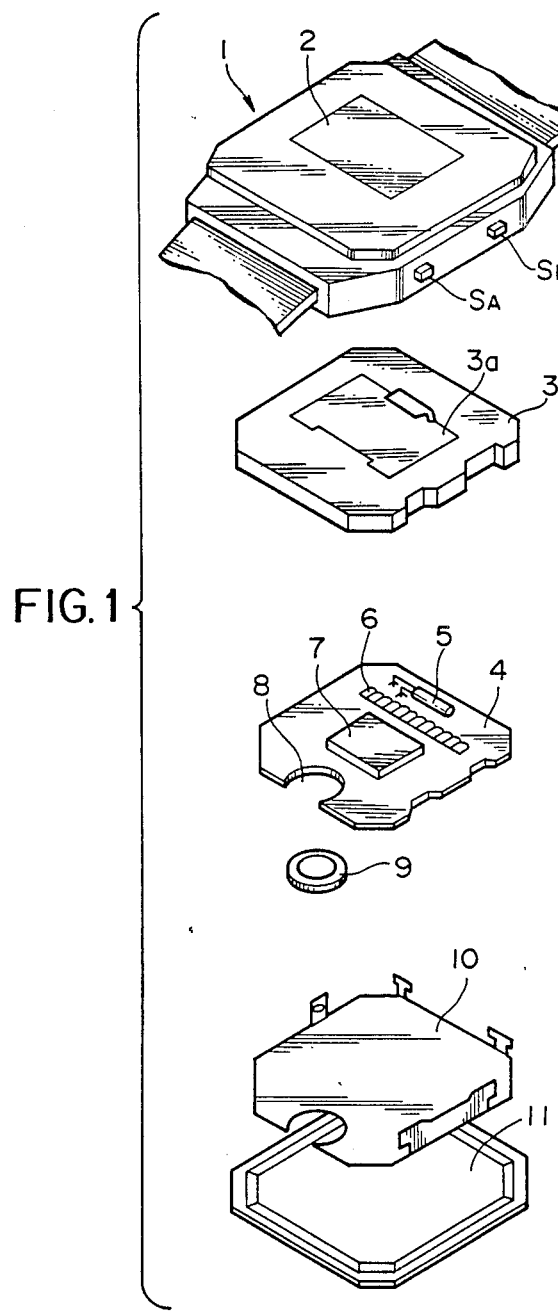
FIG. 1 is an exploded perspective view of an electronic wrist watch in which an exercise measuring instrument according to the present invention is installed.

FIG. 1 is an exploded perspective view of an electronic wrist watch to which a pedometer is installed. A watch glass 2 is provided on an upper surface of a wrist watch casing 1, and a mode-selecting switch $S_A$ and a stride-length setting switch $S_B$ to be described in detail later are disposed on a side wall of the casing 1. A symbol 3 represents a housing of synthetic resin on which a liquid crystal display panel 3a and a symbol 4 represents a circuit board. On the circuit board 4 are mounted an acceleration sensor 5 and a LSI 7, as will be described in detail below, in addition to electronic parts of a quartz-crystal oscillator and the like (not shown in Figure). The circuit board 4 is also formed with a terminal section 6 through which signals are supplied from LSl 7 to the liquid crystal display panel 3a. In addition, the circuit board 4 is formed with a battery receiving portion 8 where a battery 9 is accommodated. A symbol 10 denotes a base plate. The housing 3, the circuit board 4 and the base plate 10 are integrally stacked onto each other, forming a watch module which is to be accommodated within the wrist watch casing 1. A symbol 11 denotes a rear cover.

Figure 2:
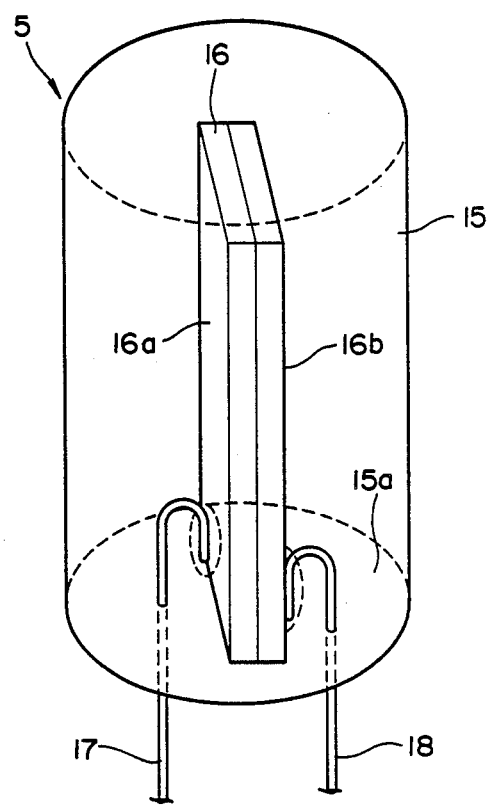
FIG. 2 is a view illustrating a construction of an acceleration sensor shown in FIG. 1.

FIG. 2 is a view illustrating in detail the acceleration sensor 5 shown in FIG. 1. A piezoelectric-element piece 16 comprising a pair of piezoelectric-elements 16a and 16b of a thin plate coupled to each other is received in a cylindrical metal case 15. One end of the piezoelectric-element piece 16 is fixed onto a bottom of the metal case 15 and the other end thereof serves as a free end. Ends of a pair of lead wires 17, 18 are electrically connected with soldering to portions in the vicinity of the fixed ends on side surfaces of the piezoelectric-element piece 16 and the lead wires extend outwardly away from the metal case 15.

The piezoelectric-element piece 16 is fixed onto the bottom of the case 15 such that the side surfaces of the piezoelectric-elements 16a, 16b face to each other are disposed perpendicularly to the surface of the circuit board 4 shown in FIG. 1.

Figure 3:
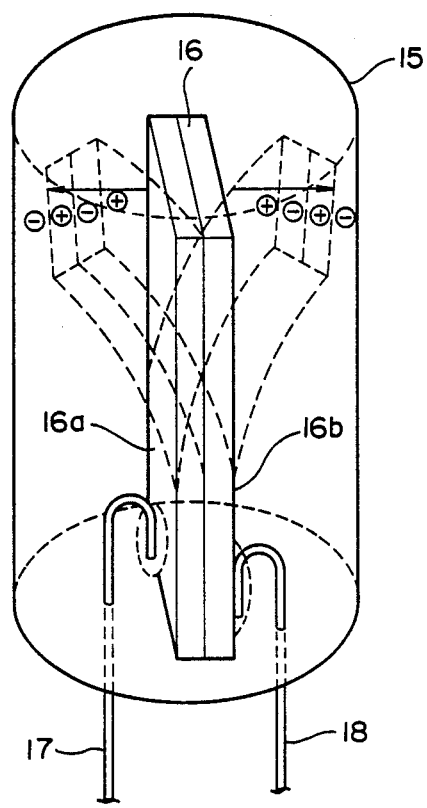
FIG. 3 is a view effective to describe an operation of the acceleration sensor.

Hence, when the user of the device wears the electronic wrist watch mentioned above on his or her wrist and walks or runs moving his or her wrist up and down, the free end of the piezoelectric-element piece 16 contained in the acceleration sensor 5 vibrates in the direction indicated by allows shown in FIG. 3.

At this time, each of the piezoelectric elements 16a, 16b attached on the piezoelectric-element piece 16 receives pressure and tension alternatively. Therefore, a positive and negative charge are alternatively induced in both the surfaces of the piezoelectric-element piece 16. That is, when a negative charge is induced at the side surface of the piezoelectric-element 16a, a positive polarization charge of the same quantity as the negative charge is induced at the side surface of the piezoelectric-element 16b and the polarization charge becomes maximum when the piezoelectric-element piece 16 is deformed maximally.

Figure 4:
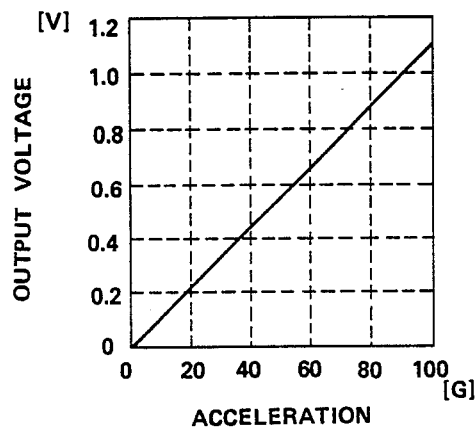
FIG. 4 is a view illustrating a voltage waveform generated by the acceleration sensor.

Hence a voltage corresponding to the polarization charge induced at both the side surfaces is generated across the lead wires 17, 18. FIG. 4 is a graph indicating a relationship between the above voltage and acceleration resulting from vibrations, impacts and the like applied to the acceleration sensor 5, where the axis of ordinates indicates an output voltage (V) and the axis of abscisas indicates an acceleration (G). As shown in FIG. 4, the induced voltage is proportional to the acceleration which is applied to the piezoelectric-element piece 16 while the user of the wrist watch is running.

Figure 5:
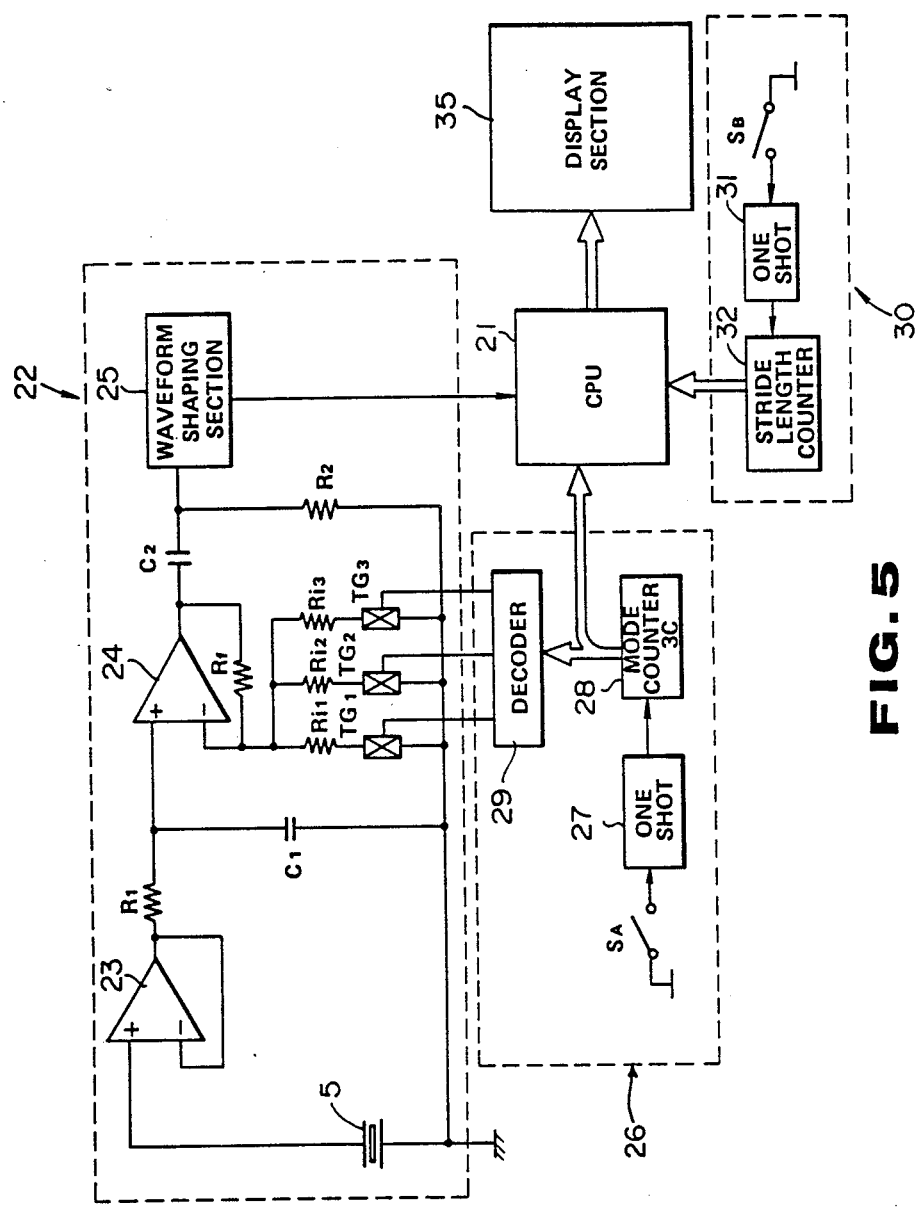
FIG. 5 is a view illustrating a circuit arrangement of the exercise measuring instrument according to the present invention.

FIG. 5 is a view illustrating a circuit arrangement of the present embodiment.

A symbol 5 denotes the acceleration sensor, which is constructed as described with reference to FIG. 2. One of the lead wires of the acceleration sensor 5 is earthed and the other lead wire is connected to a positive input-terminal of an operational amplifier 23. An output terminal of the operation amplifier 23 is connected directly to its negative input-terminal and the operational amplifier 23 serves as a voltage follower. A resistance $R_1$ connected between the output terminal of the operational amplifier 23 and a positive input-terminal of an operational amplifier 24, and a capacitor $C_1$ connected between the positive input-terminal of the operational amplifier 24 and the earth compose a low-pass filter, which attenuates high-frequency components contained in an output signal of the operational amplifier 23, thereby smoothing said output signal. The output signal of the operational amplifier 24 which receives at its positive input-terminal the signal of the operational amplifier 23 is in part supplied through a feedback resistor $R_f$ to the negative input-terminal of the operational amplifier 24. Respective one-ends of resistors $R_{i1}$, $R_{i2}$ and $R_{i3}$ are coupled to the negative input-terminal of the operational amplifier 24 and their other ends are earthed through transfer-gate circuits $TG_1$, $TG_2$ and $TG_3$, open/close operations of which circuits are controlled by an open/close control signal supplied from a mode-setting section 26 which will be described later. The values of the resistors $R_{i1}$, $R_{i2}$ and $R_{i3}$ are given under a condition of $R_{i1} < R_{i2} < R_{i3}$. A capacitor $C_2$ connected between the output terminal of the operational amplifier 24 and a waveform-shaping section 25, and a resistance $R_2$ connected between the input terminal of the waveform-shaping section 25 and the earth compose a high-pass filter, which eliminates a direct-current component from the output signal of the operational amplifier 24. The waveform-shaping section 25 comprises a circuit which shapes waveforms of signals delivered from the operational amplifier 24 to obtain pulse signals. A signal-producing section 22 is composed of the above mentioned circuit sections.

Now, a construction of the mode-setting section 26 will be described. The present embodiment has three modes, that is, a walking mode which is set while the user of the instrument is walking at a normal walking speed such as a strolling speed, an exercise-walking mode which is set while the user is walking for exercise with relatively long strides and at a relatively high pitch for the purpose of physical training, e.g., strengthening the heart and lungs, and a running mode (a jogging mode) which is set while the user is running at a higher pitch than that of the exercise walking. A mode-selecting switch $S_A$ is used to select one of these modes. A one-shot circuit 27 generates a one-shot pulse signal each time the mode-selecting switch $S_A$ is operated. A mode counter 28 is a divided-by-3 counter which increments the count by "+1" each time it receives a one-shot signal from the one-shot circuit 27. When the count is "0", the walking mode is designated; when "1", the exercise walking mode is designated; and when "2", the running mode is designated. The mode counter 28 delivers the count data to a decoder 29 and a central processing unit (CPU) 21. The decoder 29 controls the above mentioned transfer-gate circuits on the basis of the count supplied from the mode counter 28, that is, the decoder 29 makes the transfer-gate circuit $TG_1$ "ON state" when the count is "0", the transfer-gate circuit $TG_2$ "ON state" when the count is "1", and the transfer-gate circuit $TG_3$ "ON state" when the count is "2".

A stride-length setting section 30 comprises the stride-length setting switch $S_B$, one-shot circuit 31 and a stride-length counter 32. The stride-length setting switch $S_B$ is used to set a stride-length. The one-shot circuit 31 generates one-shot pulse signal each time the stride-length setting switch $S_B$ is operated. The stride-length counter 32 counts one-shot pulses delivered from the one-shot circuit 31 to obtain stride-length data, which is supplied to CPU 21.

A display section 35 displays, for instance, in a digital fashion data delivered from CPU 21.

CPU 21 is provided with a time-counting circuit (not shown) for obtaining the present time data and a counting circuit (not shown) counts the number of pulse signals delivered from the waveform-shaping section 25 contained in the signal-producing section 22 in order to count the number of steps. CPU 21 further calculates a distance-walked or a running distance by multiplying the counted number of steps by stride-length data delivered from the stride-length counter 32 of the stride-length setting section 30, and also confirms the count of the mode counter 28. Thus, CPU 21 displays on the display section 35 the present-time data or the number of steps, the stride-length data, the distance-walked and the designated mode.

OPERATION OF THE FIRST EMBODIMENT

With respect to the present embodiment, the operations in the walking mode, the exercise walking mode and the running mode will be described hereinafter, respectively.

(A) Operation in the walking mode

The operation of the embodiment in the walking mode will be described first. The user of the instrument operates the mode-selecting switch $S_A$ and sets the instrument to the walking mode before starting his or her walking, that is, when the mode-selecting switch $S_A$ is operated. The one-shot circuit 27 outputs one-shot pulse signal to the mode counter 28 to set the mode counter at "0" and thereby the walking mode is set. At this time, CPU 21 takes in the predetermined count of the mode counter 28 to display it on the display section 35, thereby allowing the user to confirm by viewing the display section 35 whether or not the desired mode is set. Then the user operates the stride-length setting switch $S_B$ to set stride-length. At this time, CPU 21 also takes in the stride length designated by the stride-length counter 32 and displays it on the display section 35, so that the user can confirm on the display section 35 whether or not a desired stride-length is set.

Figure 6A:
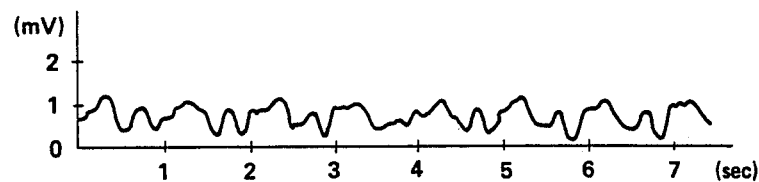
FIGS. 6A to 6C are views illustrating signal waveforms outputted by the acceleration sensor.

Having prepared in the above mentioned manner, the user starts walking. Movement of the user's wrist causes the piezoelectric-element piece 16 of the acceleration sensor 5 to vibrate and thereby the acceleration sensor 5 outputs a signal having a waveform as illustrated in FIG. 6A at the positive input terminal of the operational amplifier 23. The signal of the above mentioned waveform is delivered through the operational amplifier 23 acting as a voltage follower to the low-pass filter consisting of the resistance $R_1$ and the capacitor $C_1$ where the high frequency components of the signal are attenuated, and then the signal is further supplied to the positive input-terminal of the operational amplifier 24. At this time, the mode counter 28 has been set at "0", and thereby the decoder 29 sends an open/close control signal so as to make only the transfer gate $TG_1$ ON. The operational amplifier 24, the feedback resistance $R_f$ and the resistance $R_{i1}$ compose a non phase-inverting amplifier having a gain, $1+R_f/R_{i1}$. The signal is multiplied by $1+R_f/R_{i1}$ and then supplied to the high-pass filter consisting of the capacitor $C_2$ and the resistance $R_2$ The signal amplified by $1+R_f/R_{i1}$, the direct current component of which is eliminated by the high-pass filter, is supplied to the waveform-shaping section 25. The waveform-shaping section 25 deforms the supplied signal into a pulse signal and delivers it to CPU 21. CPU 21 counts variation points where the signal level changes from low to high to obtain step data and calculates a distance-walked data by multiplying the step data by the stride-length supplied from the stride-length counter 32 and then displays thus calculated distance-walked data on the display section 35. The display section 35 sequentially displays the step data and the distance-walked data.

(B) Operation of the embodiment in the exercise-walking mode

Figure 6B:
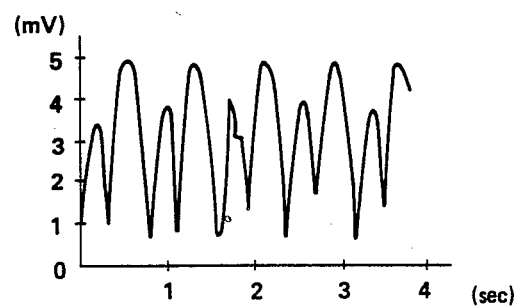

The operation of the embodiment in the exercise-walking mode will be described. In this case, the mode-selecting switch $S_A$ is operated in the same manner as the mentioned above in order to set the mode counter 28 at "1", thereby making only the transfer gate $TG_2$ "ON state". Then the stride-length setting switch $S_B$ is operated to set a stride length to be taken during the exercise walking to the stride-length counter 32. After completion of the operations mentioned above, the user of the instrument will start walking. The user will walk with his or her arms bent and moving his or her arms more strongly and faster than during walking in the above mentioned mode. Therefore, as illustrated in FIG. 6B, a waveform of the signal supplied from the acceleration sensor 5 to the input terminal of the operational amplifier 23 is higher than in the walking mode, and also its period is shorter than in the walking mode. In the same manner as in the walking mode, the signal having the waveform mentioned above is delivered to the positive-input terminal of the operational amplifier 24 through the operational amplifier 23 and the low-pass filter consisting of the resistance $R_1$ and the capacitor $C_1$. As mentioned above, the mode counter 28 has been set at "1", and thereby the decoder 29 makes only the transfer gate circuit $TG_2$ "ON state". In this manner, the operational amplifier 24 connected with the feedback resistance $R_f$ and the resistance $R_{i2}$ has a gain of $1+R_f/R_{i2}$ which is lower than that in the walking mode. Hence, the signal is multiplied by $1+R_f/R_{i2}$ and supplied to the waveform-shaping section 25 through the high-pass filter consisting of the capacitor $C_2$ and the resistance $R_2$. Since the voltage output from the acceleration sensor 5 is higher than that in the walking mode as illustrated in FIG. 6B, though the gain of the operational amplifier 24 is lower than in the walking mode, the signal will have the somewhat same voltage level as in the walking mode and said signal is supplied to the waveform-shaping section 25. The waveform-shaping section 25 deforms the signal multiplied by $1+R_f/R_{i2}$ to a pulse signal and supplies said pulse signal to CPU 21. CPU 21 sends the step data and the distance-walked data obtained during the exercise walking to the display section 35 and the display section 35 displays the supplied step data and distance-walked data.

(C) Operation in the running mode

Figure 6C:
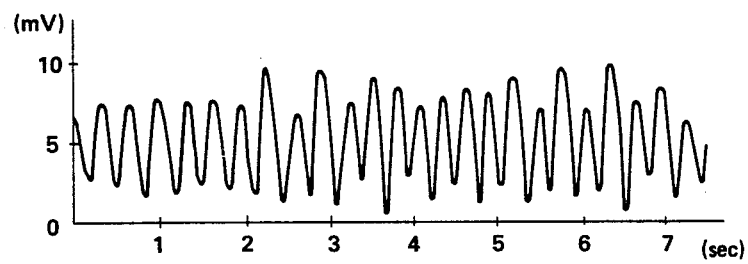

The operation of the embodiment in the running mode will be described. As in the same manner as in the walking mode and the exercise walking mode, the operation of the mode-selecting switch $S_A$ sets the mode counter 28 at "2" and causes only the transfer gate circuit $TG_3$ to be ON. And then the stride-length setting switch $S_B$ is operated to set a stride-length to be taken during running to the stride-length counter 32. After completion of the operations mentioned above, the user starts running. The user will run, moving his or her arms more strongly and faster than during the exercise walking. Therefore, as shown in FIG. 6C, the waveform of the signal to be supplied from the acceleration sensor 5 to the positive-input terminal of the operational amplifier 23 is higher than in the exercise-walking mode and the period of the signal is also shorter than in the exercise-walking mode. The signal having the waveform mentioned above is supplied to the positive-input terminal of the operational amplifier through the operational amplifier 23 and the low-pass filter consisting of the resistance $R_1$ and the capacitor $C_1$, as in the same way as in the walking mode and the exercise-walking mode. By the way, as mentioned above, the mode counter 28 has been set at "2", and the decoder 29 causes only the transfer gate circuit $TG_3$ to be ON. The operational amplifier 24 combined with the feedback resistance $R_f$ and the resistance $R_{i3}$ has a gain of $1+R_f/R_{i3}$, which is lower than in the exercise-walking mode. The signal is multiplied by $1+R_f/R_{i3}$ and delivered to the waveform-shaping section 25. Since the output voltage of the acceleration sensor 5 in the running mode is higher than in the exercise-walking mode, even though the gain of the operational amplifier 24 in the running mode is lower than in the walking mode and exercise-walking mode, the signal having the somewhat same voltage as in both the modes is supplied to the waveform-shaping section 25. The waveform-shaping section 25 deforms the multiplied-by-$1+R_f/R_{i3}$ signal to a pulse signal in order to apply it to CPU 21. CPU 21 counts variation points where the pulse signal varies from a low level to a high level and calculates step data and a distance-run data in the running mode on the basis of the number of the variation points and the stride-length data transferred from the stride-length counter 32 and sends these calculated data to the display section 35 so as to sequentially display them on the display section 35.

As mentioned above, in the embodiment, the acceleration sensor using a piezoelectric element can detect vibrations which are caused while the user is walking, exercise walking or running and an amplifier whose gain is determined based upon forms of the exercise such as walking, exercise walking or running amplifies the detected electric signal, and thereby an accurate number of steps taken can be counted.

(Second Embodiment)

An example where the user walks for exercise with his or her arms bent has been described with reference to the above mentioned embodiment.

However, it has been found that an accurate number of steps taken can not be counted when the user wears the pedometer on his or her wrist and walks for exercise with his or her elbows not bent and his or her arms extending straight.

In addition, experiments have taught that the above mentioned trouble results from a phenomenon that the acceleration sensor sensing movements of a body in exercise walking can not accurately sense the walking motion in the second step.

Figure 7A:
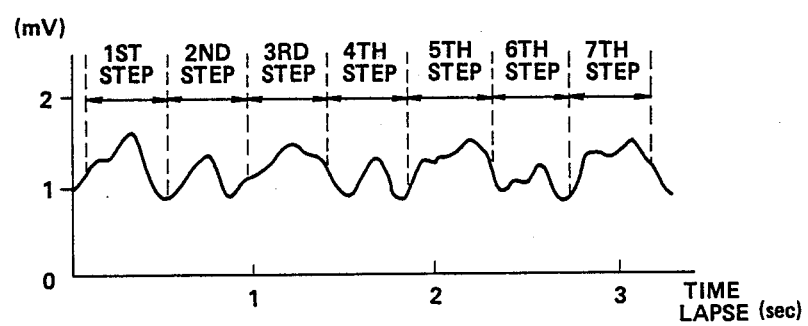
FIGS. 7A to 7D are views illustrating relationships between number of steps and the signal waveforms outputted by the acceleration sensor.
Figure 7B:
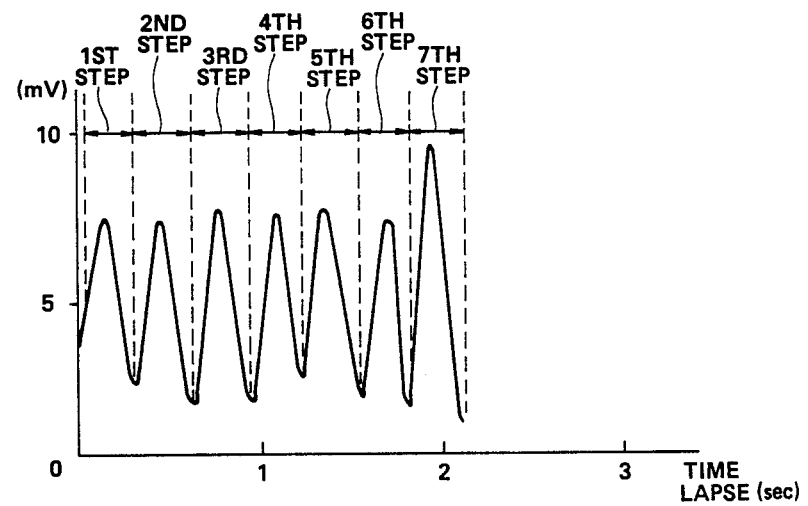
Figure 7C:
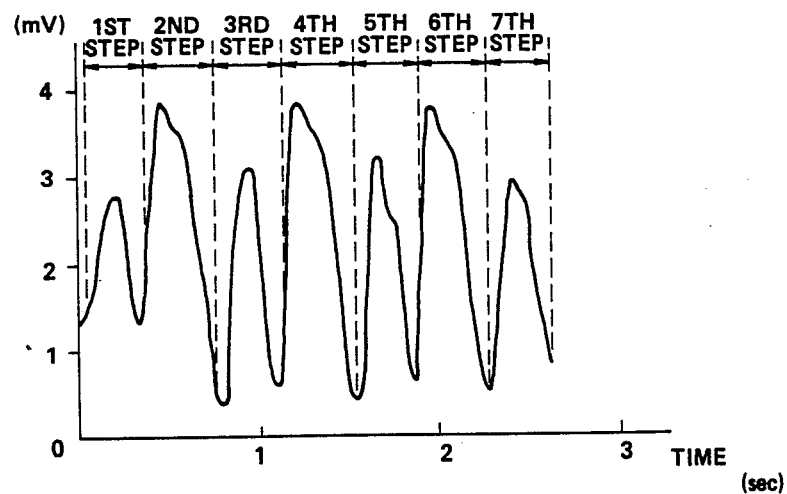
Figure 7D:
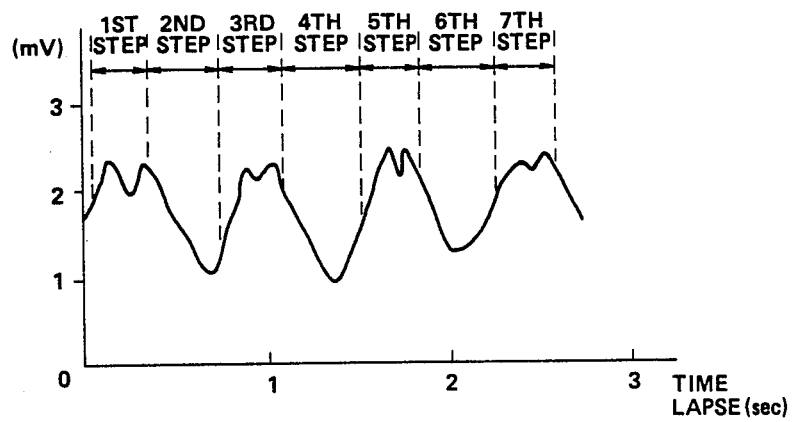

FIGS. 7A to 7D are views showing waveforms of outputs of the acceleration sensor. FIG. 7A is a view illustrating a waveform of the signal generated during walking. FIG. 7B is a view showing a waveform of the signal generated during running. FIG. 7C is a view showing a waveform of the signal generated while the user walks for exercise with his or her elbows bent. FIG. 7D is a view showing a waveform of the signal generated while the user walks for exercise with his or her arms extending straight. Note that in FIGS. 7A to 7D, the axis of abscisas represents time lapse (SEC) and the axis of ordinates represents the output voltage (mV) of the acceleration sensor and the waveforms are obtained by actually measuring the output voltage of the acceleration sensor while the user is walking or running. And each step is distinguished by dotted lines.

Respective peaks of the waveform generated in walking shown in FIG. 7A, the waveform generated in running shown in FIG. 7B, and the waveform generated in exercise walking with elbows bent shown in FIG. 7C correspond to one step. But in exercise walking with elbows extended straight, such waveform is generated that a large peak having two small peaks appears at the first step, and no peak appears at the second step, and again a large peak having two small peaks appears at the third step, and no peak appears at the fourth step and so on, as illustrated in FIG. 7D.

With respect to the waveform shown in FIG. 7D, it is difficult to detect small peaks in order to count the number of steps taken and as the result small peaks are not detected and therefore steps in even numbers are not counted. Accordingly, there exists such a disadvantage that no accurate number of steps taken can be counted in exercise walking with elbows extended straight.

The second embodiment to be described below is arranged such that an accurate number of steps can be counted even in any exercise such as walking, running, exercise walking with elbows extended straight or the like, and thereby the above mentioned disadvantage is overcome.

Figure 8:
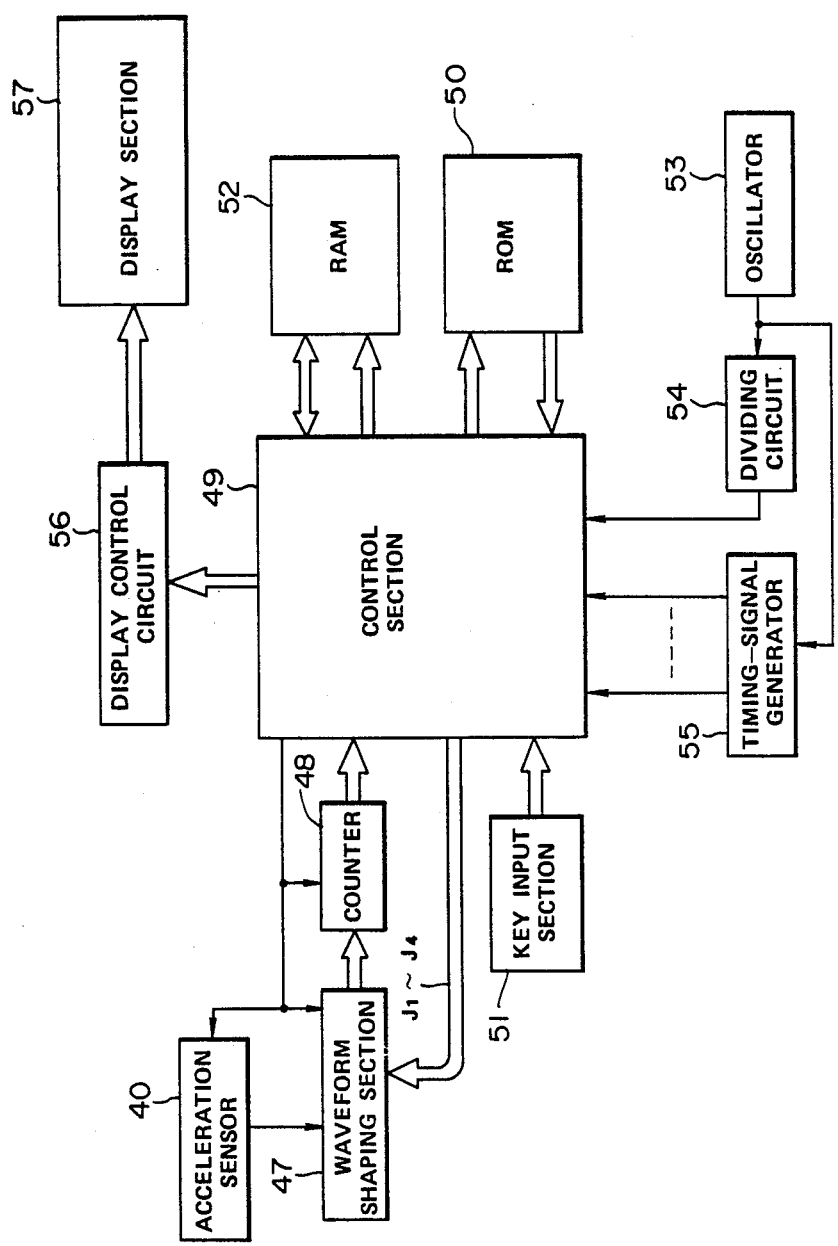
FIG. 8 is a view illustrating a circuit arrangement of other embodiment of the present invention.

FIG. 8 is a block diagram of the second embodiment. In FIG. 8, an acceleration sensor 40 is the same as the sensor shown in FIGS. 2 and 3 and is installed in the wrist watch in the same manner as in FIG. 1. The output signal of the acceleration sensor 40 is applied to a waveform-shaping section 47 and the waveform-shaping section 47 shapes the output signal of the acceleration sensor 40 into a pulse signal having a square waveform. The pulse signal outputted from the waveform-shaping section 47 is counted by a counter 48 and the count data is supplied to a control section 49. The control section 49 comprises a CPU which reads out from a ROM 50 a micro-programme stored in the ROM 50 to operate the present system when the operator inputs a system-start signal to the control section 49 by operating a key-input section 51 and executes processes in accordance with the micro-programme. The control section 49 calculates the number of steps on the basis of the count data delivered from the counter 48 and further calculates the number of steps or a distance-walked on the basis of the count data of the counter 48 and stride-length data previously stored in a RAM 52 through the control section 49 from the key-input section 51. Then the control section 49 sends the calculated data to a display section 57 through a display control circuit 56, which displays the calculated data. An oscillator circuit 53 is a quartz-crystal oscillator and generates a reference signal of 32,768 Hz. The oscillator circuit 53 delivers the reference signal to a dividing circuit 54 and a timing-signal generator circuit 55. The dividing circuit 54 divides the reference signal and outputs to the control section 49 a one-Hz signal to count the hour and outputs for example 64-Hz and 128-Hz signals to shape the waveform of the output signal of the acceleration sensor 40. The control section 49 processes the one-Hz signal in accordance with the programme to obtain time data and stores the time-data at an hour register of RAM 52 to be described below. Further, the control section 49 sends the time-data, i.e., the present-time data comprising minute-data, hour-data, date-data and month-data to the display section 57 through the display-control circuit 56 and the display section 57 displays the present-time data. The control section 49 controls and counts the step data inputted through the acceleration sensor 40, the waveform-shaping section 47 and the counter 48, and sends the counted step data to the display section 57 through the display-control circuit 56. The display section 57 displays the step data. At this time, the control section 49 delivers a control signal of any one of a walking-signal J1, a running-signal J2, an exercise-walking signal J3 generated in exercise walking with arms bent or an exercise-walking signal J4 generated in exercise walking with arms extended straight to the waveform-shaping section 17 in accordance with the mode previously set by operating of the key-input section 51. Meanwhile, the timing signal-generator circuit 55 delivers a timing signal to the control section 49 so as to synchronize the processing operations of the control section 49 in accordance with the received reference signal.

Figure 9:
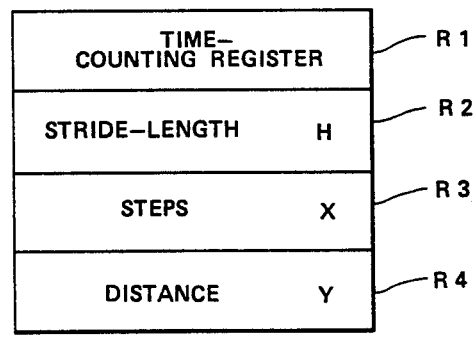
FIG. 9 is a view illustrating details of RAM 52 shown in FIG. 8.

FIG. 9 illustrates memory contents of the above mentioned RAM 52. A symbol R1 denotes a time-measurement register, which stores time-measurement data. A symbol R2 stands for a stride-length register, which stores stride-length data H. A symbol R3 stands for a step register, which stores step data X. And a symbol R4 stands for a distance register, which stores distance data Y.

Figure 10:
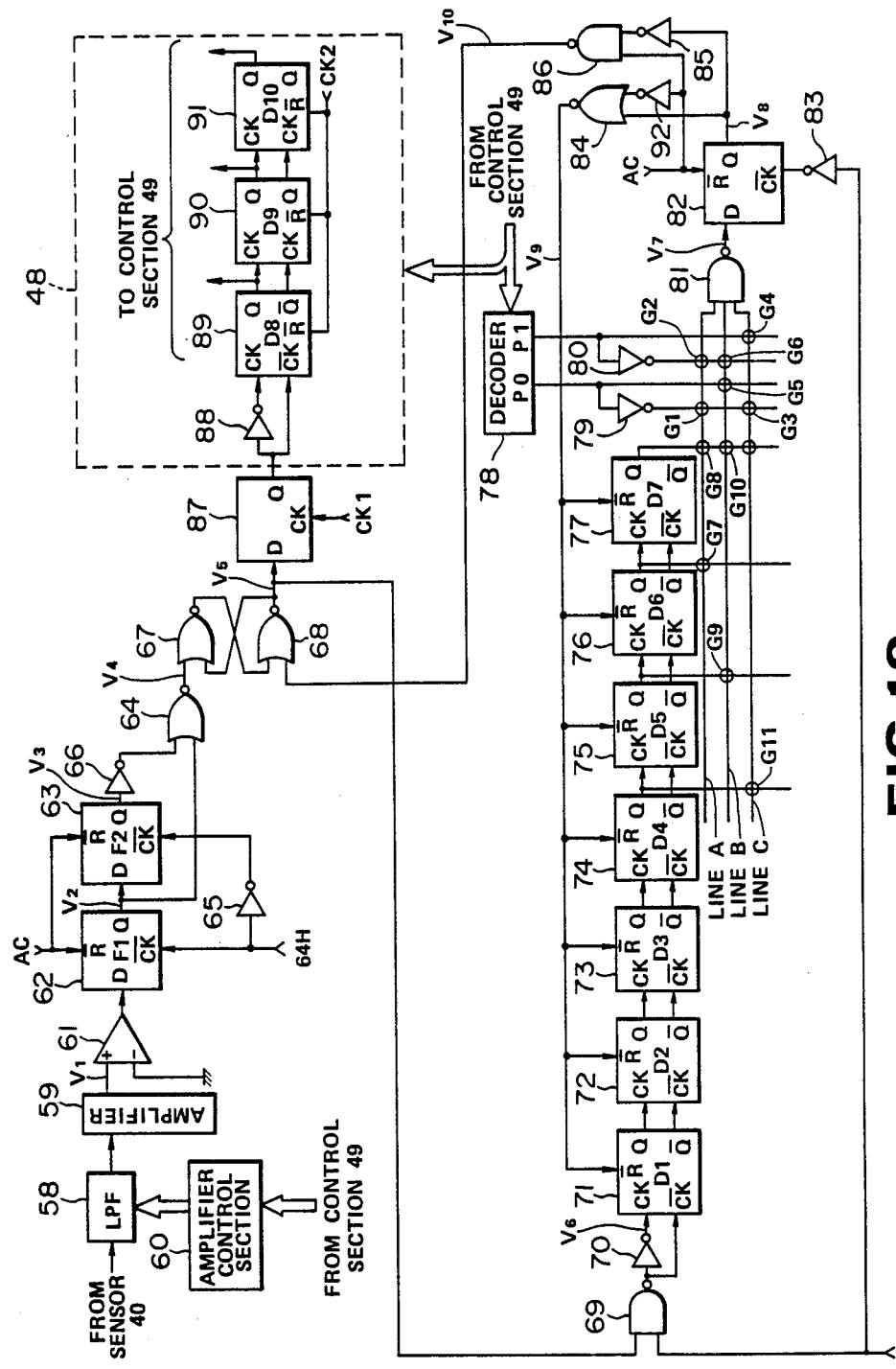
FIG. 10 is a view illustrating details of a waveform shaping section 47 and a counter 48 shown in FIG. 8.
Figure 11A:
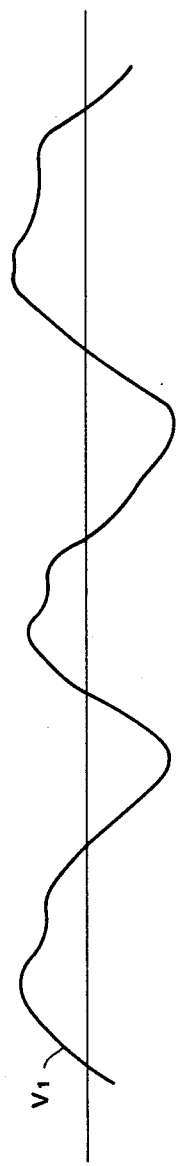
FIG. 11A and 11B are timing charts of the circuit shown in FIG. 10.
Figure 11B:
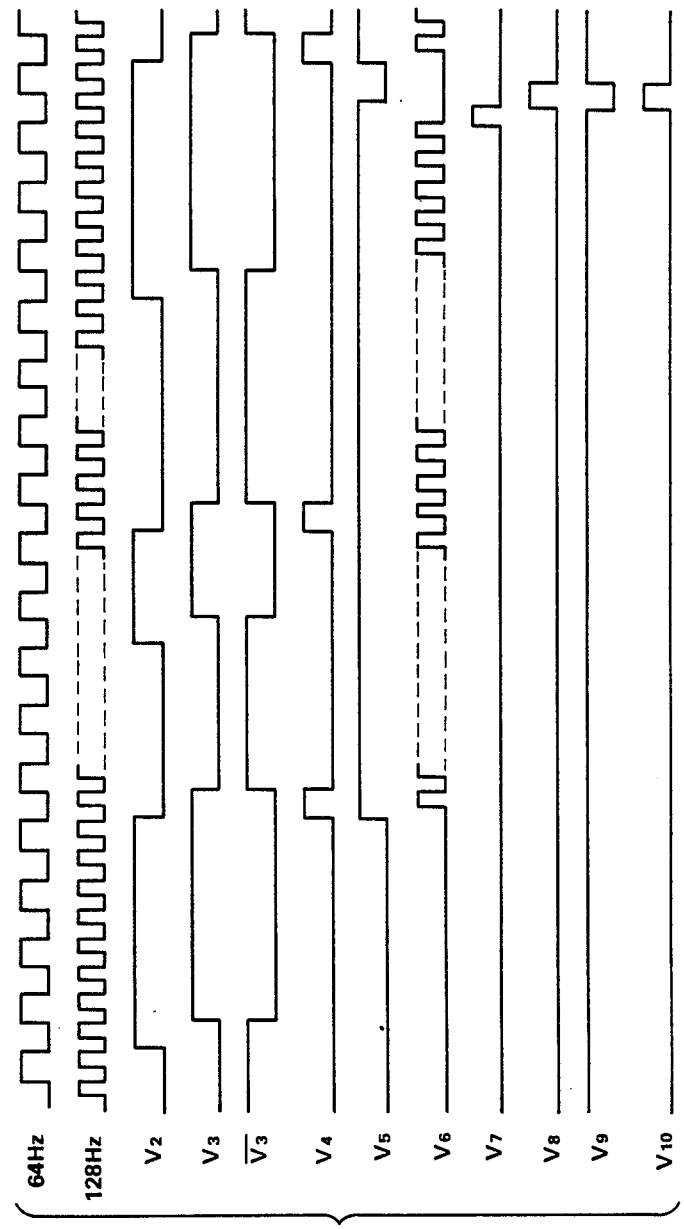

FIG. 10 is a circuit diagram of the above mentioned waveform-shaping section 47 and counter 48. FIGS. 11A and 11B are timing charts with respect to the waveform-shaping section 47.

In FIG. 10, a low-pass filter (hereinafter, referred to as LPF) 58 attenuates high frequency components of the signal received from the acceleration sensor 40 in order to eliminate noises therefrom. The signal outputted from the LPF 58 is supplied to an amplifier 59, whose gain is selected depending on the mode of the exercise form inputted from the control section 49 through an amplifier-control section 60, and is amplified to somewhat a constant voltage level. The above mentioned amplifier 59 and amplifier control section 60 have the same arrangements as those of FIG. 5. FIG. 11B is a view illustrating a waveform of the output signal generated in walking. FIG. 11B is a timing chart with respect to the waveform-shaping section 47. The output signal V1 of the amplifier 59 is delivered to an input terminal of a comparator 61 and is transformed to a square-wave signal. The output signal of the comparator 61 is delivered to a flip-flop 62, which begins to operate at the trailing edges of the signal of 64 Hz supplied thereto from the dividing circuit 54 so as to delay the delivered signal, thereby forming a signal $V_2$. The signal $V_2$ is inputted to a flip-flop 63. The waveform $V_2$ shown in FIG. 11B is obtained when the output $V_1$ (whose waveform is shown in FIG. 11A) generated in walking is inputted from the sensor 40. The signal $V_2$ is inputted to a NOR gate 64. When a reset signal AC from the control section 47 is applied to flip-flops 62 and 63 at their reset terminals $\overline{R}$, the flip-flops 62 and 63 are reset.

The signal of 64 Hz inverted by an inverter 65 is supplied to the flip-flop 63 at its clock terminal $\overline{CK}$ and thereby the flip-flop 63 delays the signal $V_2$ so as to output the signal $V_3$ shown in FIG. 11B. The signal $V_3$ is inverted by an inverter 66 and the inverted signal $\overline{V_3}$ shown in FIG. 11B is applied to a NOR gate 64. Hence the signal $V_2$ and the signal $\overline{V_3}$ which is obtained by inverting the delayed signal $V_2$ are applied to the NOR gate 64. The NOR gate 64 outputs a set signal $V_4$ shown in FIG. 11B including pulses, each of which pulses corresponds to one step in walking. The signal $V_4$ is delivered to an RS flip-flop comprising NOR gates 67 and 68. Receiving the signal $V_4$, the RS flip-flop switches its output $V_5$ to a high level (refer to FIG. 11B, $V_5$). If the level of the output $V_5$ is high, the output $V_5$ is not affected by the signal $V_4$. The output signal $V_5$ of the RS flip-flop comprising the NOR gates 67 and 68 is delivered to a NAND gate 69. The NAND gate 69 also receives the signal of 128 Hz from the dividing circuit 54 through the control section 49 and the output signal of the NAND gate 69 is supplied to a counter comprising seven flip-flops 71 through 77. The flip-flop 74 of the counter counts the signal of 128Hz up to eight pulses and outputs a signal at its Q-output terminal and the flip-flop 75 counts the signal up to 16 pulses and outputs a signal at its Q-output terminal. Counting up to 32 pulses, the flip-flop 76 outputs a signal at its Q-output terminal and the flip-flop 77 counts up to 64 pulses and then outputs a signal. Receiving the walking signal J1 from the control section 49 while a step-counting function is selected by operating a mode-selecting switch (not shown) of the key-input section 51, a mode-selecting decoder 78 selects the walking mode and provides output signals, P0=0, P1=0. These signals are inverted to high level signals by inverters 79 and 80 and supplied to gates $G_1$ and $G_2$ and thereby the mode-selecting decoder 78 selects a line A. When the running signal J2 is delivered from the control section 49 to the mode-selecting decoder 78 by operating the mode-selecting switch, the decoder 78 outputs the output signals P0=0, P1=1 and selects a line C where a signal of "1" is supplied to gates $G_3$ and $G_4$. In the same manner, when the exercise-walking signal J3 or J4 is inputted from the control section 49, the decoder 78 outputs the output signals P0=1, P1=0 and selects a line B where a signal of "1" is applied to gates $G_5$ and $G_6$.

Since the Q-outputs of the flip-flops 76 and 77 are supplied to the line A, when the signal of 128 Hz is counted up to 96 pulses, the output is applied to the NAND gate 81 from the line A and the NAND gate 81 generates a high-level output signal $V_7$ (FIG. 11B, at $V_7$). The output signal $V_7$ is applied to a flip-flop 82 and latched by the signal of 128 Hz inverted by an inverter 83 thereby deformed to a signal $V_8$ (FIG. 11B, at $V_8$). The signal $V_8$ is supplied to the flip-flops 71 through 77 of the counter through a NOR gate 84 so as to reset these flip-flops. Furthermore, the signal $V_8$ is delivered to the NOR gate 68 through an inverter 85 and NAND gate 86, causing the signal $V_5$ to go low. In this manner, the pulse generated in response to the following walking motion can be detected. That is, since the line A is selected where the walking signal $J_1$ is inputted, and the gates $G_7$ and $G_8$ are selected to receive the Q-outputs of the flip-flops 76 and 77, the signal $V_5$ is caused to go low after the signal of 128 Hz is counted up to 98-counts or during a time period of approximately 0.75 sec. Accordingly, even if the signal $V_4$ is inputted to the NOR gate 67 while the signal $V_5$ has been high, the signal $V_5$ is not changed. This means that since experiments teach that while a man is walking, he takes the second step within a time interval of 0.75 sec after he takes the first step, a signal $V_4$ corresponding to the second step is not counted even if said signal $V_4$ is generated during said time interval. In the similar manner, while the running signal $J_2$ is applied to the decoder 78, since the line C is selected, the gate $G_{11}$ is selected, and then the Q-output of the flip-flop 74 is selected, the signal $V_5$ is caused to go low after the signal of 128 Hz has been counted up to 72 counts or for a time period of approximately 0.56 sec. This means that the second step in walking is not counted. Furthermore, when the exercise-walking signal $J_3$ or $J_4$ is inputted to the mode-selecting decoder 78, since the line B is selected, and the gates $G_9$ and $G_{10}$ are selected, and thereby the Q-outputs of the flip-flops 75 and 77 are selected, the signal $V_5$ is caused to go low after the signal of 128 Hz has been counted up to 80 counts or for a time period of approximately 0.625 sec. Therefore, the second step in exercise walking is not counted.

Accordingly, as mentioned above, pulses corresponding to steps in odd numbers are counted regardless of the generation of pulses corresponding to steps in even numbers in walking, running or exercise walking, and thereby an accurate number of steps taken can be calculated by multiplying the number of the counted pulses by 2 irrespective of the generation of the pulses corresponding to steps in even numbers.

An electronic circuit will be described for processing the signal $V_5$ comprising pulses generated every two steps taken. The signal $V_5$ comprising pulses generated every two steps is applied to a flip-flop 87 and further to a counter 48 in synchronism with the timing signal CK1 delivered to the flip-flop 87 from the timing-signal generating circuit 55 through the control section 49. The counter 48 comprises an inverter 88 and flip-flops 89 to 91. The output of the counter 48 is inputted to the control section 49 and is calculated to display number of steps. When the reset signal AC is inputted to the flip-flops 62, 63 and 82 from the control section 49 and further to the flip-flops 71 through 77 through the inverter 92 and the NOR gate 84, the waveform-shaping section 47 is set to its initial condition. At this time, the control section 49 outputs a signal CK2 to the flip-flops 89 to 91, causing their Q-outputs to go low and thereby the counter is set to the initial condition. When the step-calculating function is selected by depressing the mode-selecting switch $SW_1$, the control section 49 generates the signal AC.

Referring to the operation-flow chart of FIG. 12 and examples of displays of display panel shown in FIGS. 13A to 13D, an operation of the pedometer will be described which is executed under control of the microprogramme stored in ROM 50.

Figure 12:
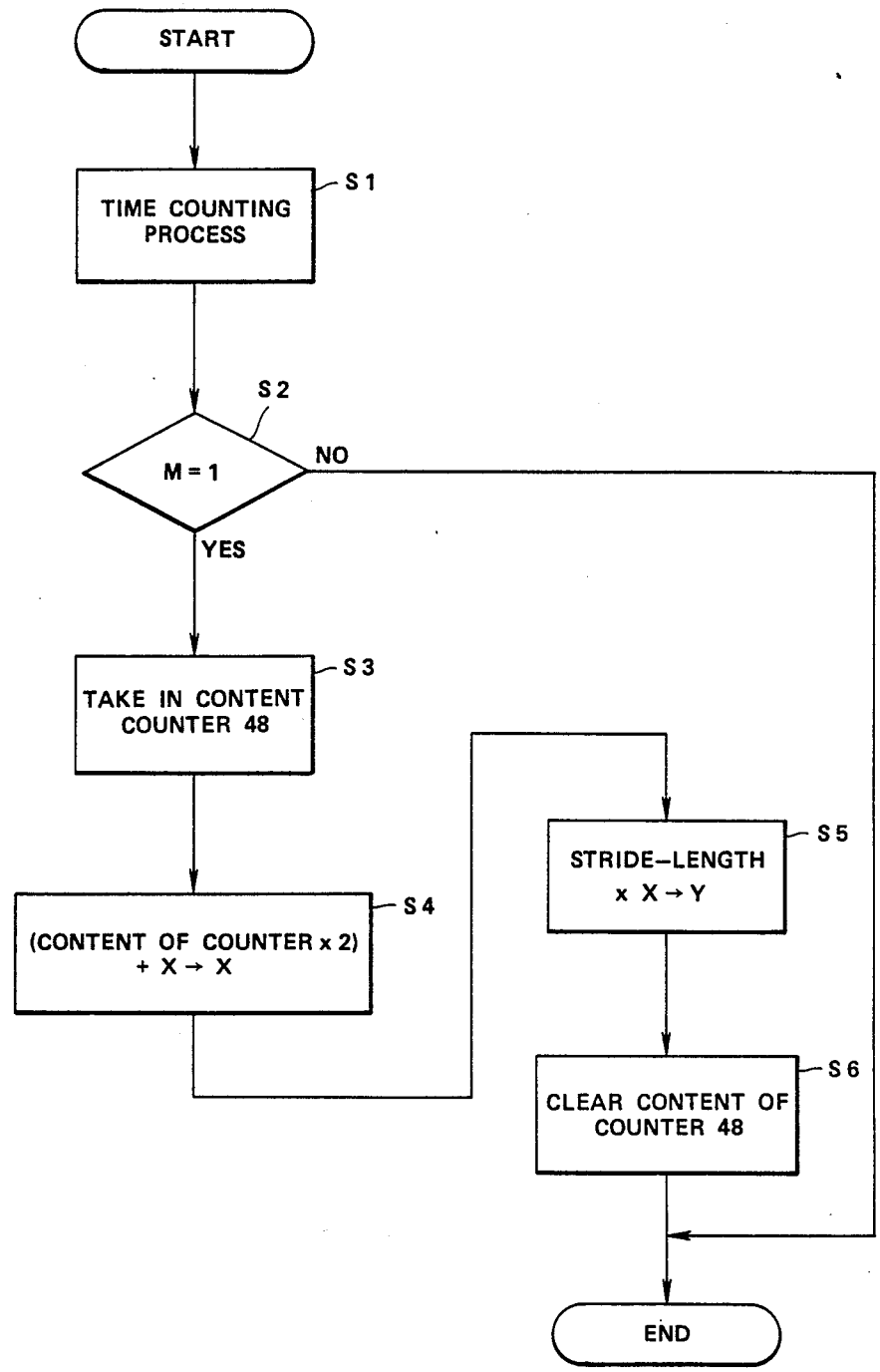
FIG. 12 is a flow chart of the circuit shown in FIG. 8.
Figure 13A:
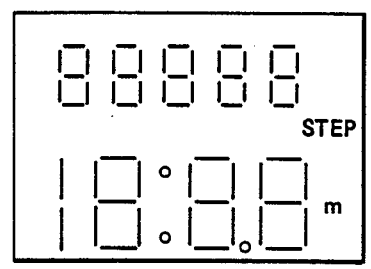
FIGS. 13A to 13D are views illustrating display states.
Figure 13B:
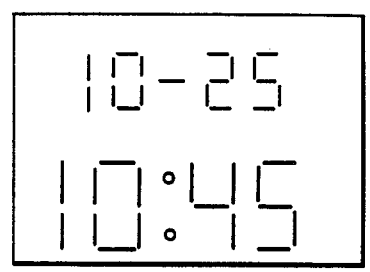
Figure 13C:
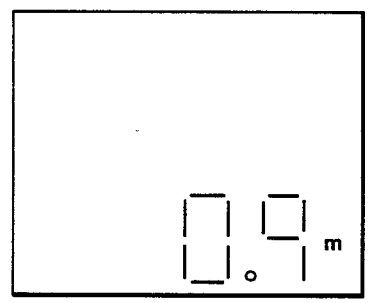
Figure 13D:
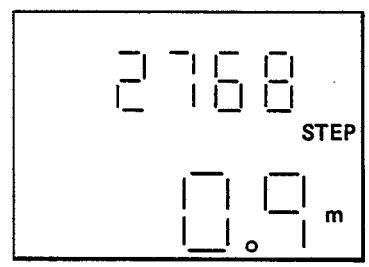

In FIG. 12, a time-counting process is executed to count the present time at step S1, and renews the time-counting register in RAM 52. FIG. 13A is a view illustrating a layout of segments of the display panel of the display section 57. FIG. 13B is a view illustrating a display indicating the present time, i.e., the date is indicated at the upper portion of the display panel and the time at its lower portion. Step S2 represents a process to discriminate whether or not a pedometer-mode (M=1) is set, and when it is discriminated at Step S2 that the mode M is not set to the pedometer-mode "1", which is indicated by "N", a step-counting is not executed and the process is terminated. When it is discriminated at Step S2 that the mode is set to the pedometer-mode, the control section 49 takes in the data X or the content of the counter 48 at Step S3. The control section 49 multiplies the content of the counter 48 by 2 and adds this product and the data which has been stored in the step-register R3, and then stores the sum as step-data X in the step-register R3 at Step S4. At Step S5, the control section 19 reads out the stride-length data H which has been previously stored in the stride-length register R2 of the RAM 52 and multiplies the stride-length data H by the step-data X to obtain distance-data Y and then stores the distance-data Y in the distance-register R4 of RAM 52. The control section 49 reads out the data from these registers and sends the data to the display section 57 through the display control circuit 56. The display section 57 displays these data. FIG. 13C is a view illustrating an example of the display of the stride-length data H. FIG. 13D is a view illustrating an example of the display of step-data X. Note that the distance-data Y is displayed alternately with the stride-length data H at the lower portion of the panel. And then at Step S6, the content of the counter 48 is cleared and the operation of the pedometer is terminated. Note that the processes at Steps S1 through S6 are executed in accordance with the time-counting timing, i.e., once per second.

In the above mentioned embodiment, one pulse is counted for every two steps in any mode of walking, exercise walking or running, but one pulse may be counted for every two steps only in the exercise-walking mode, while one pulse may be counted for each step in the walking mode and the running mode.

According to the present embodiment, even though the acceleration sensor can not sense the walking motions of steps in even numbers in exercise walking with arms extended straight, pulses inputted from the waveform-shaping section 17 is not counted during the time interval determined based on the execising form after the generation of pulses corresponding to steps in odd numbers, and only pulses corresponding to steps in odd numbers are counted and then an accurate number of steps taken can be obtained by multiplying the number of counted pulses by 2. Accordingly, the pedometer according to the present invention allows to count an accurate number of steps regardless of detection of pulses corresponding to steps in even numbers in any execising form of walking, running or exercise walking.

The embodiment in which the pedometer is worn on the wrist of the user has been described by way of example, but the instrument according to the present embodiment is applicable to the pedometer which is worn on the waist of the user. In this case, the circuit of FIG. 10 is arranged such that the outputs of the flip-flops 73 and 76 are selected and the signal $V_7$ is caused to be outputted after the signal of 128 Hz has been counted up to 36 pulses. In this manner, other pulses are not counted during the time period of approximately 0.28 sec after one pulse is counted, and thereby counting two counts per step in mistake is prevented while the user is walking, wearing the pedometer on his or her waist. The time period of 0.28 sec has been determined based on data obtained by experiments.

(Third Embodiment)

Figure 14:
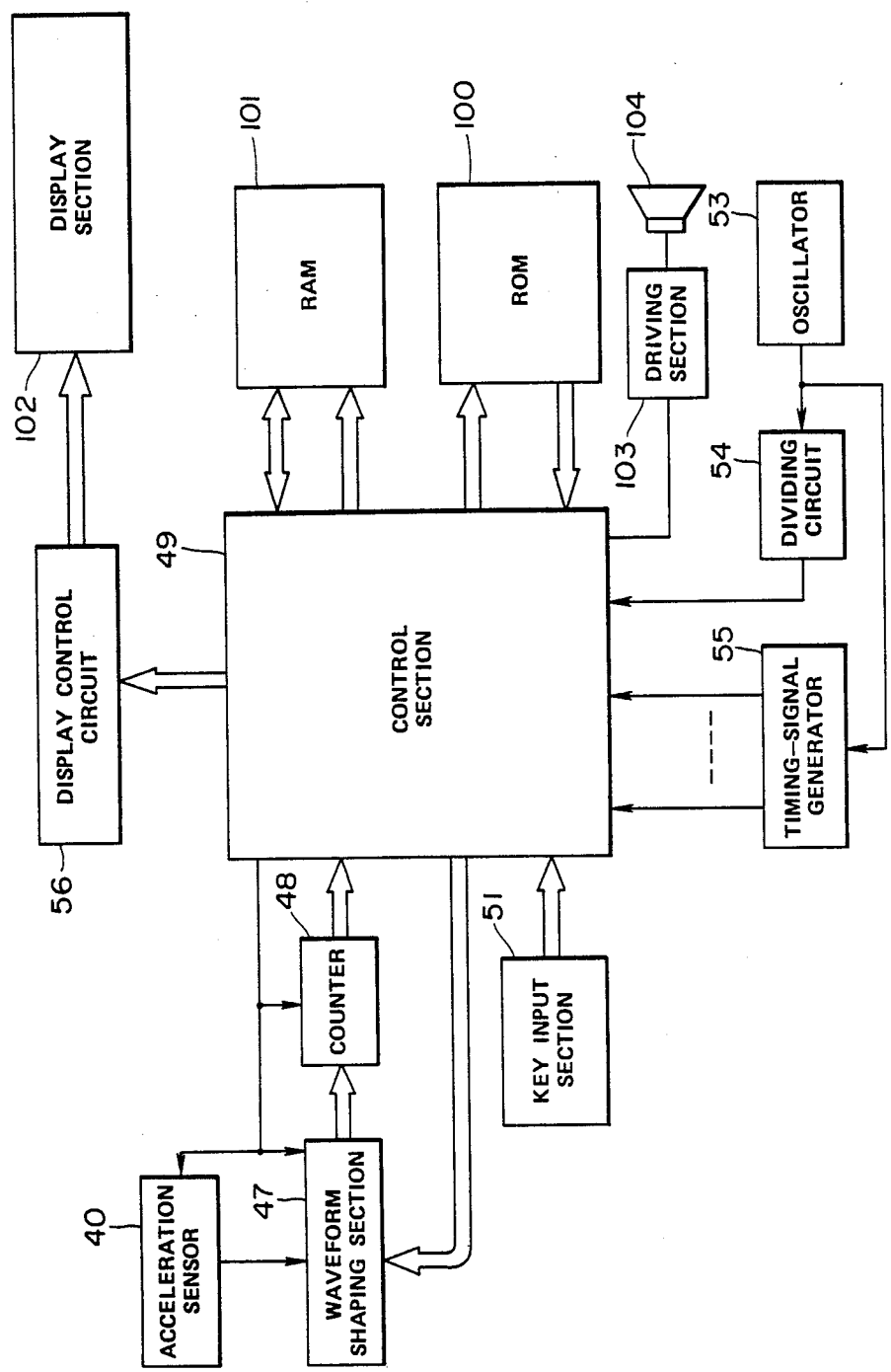
FIG. 14 is a view illustrating a circuit arrangement of a further embodiment of the present invention.

FIG. 14 is a block diagram of other embodiment according to the present invention. The embodiment of FIG. 14 employs ROM 100, RAM 101 and a display section 102 in place of ROM 50, RAM 52 and the display section 47 used in the second embodiment. ROM 100 stores other micro-programme. The third embodiment is further provided with an alarm-driving section 103 for generating an alarm and a speaker 104. The key-input section 51 comprises switches $S_1$ to $S_6$ (not shown) to be described below. The third embodiment has the same construction as the second embodiment except the mentioned above.

Figure 15:
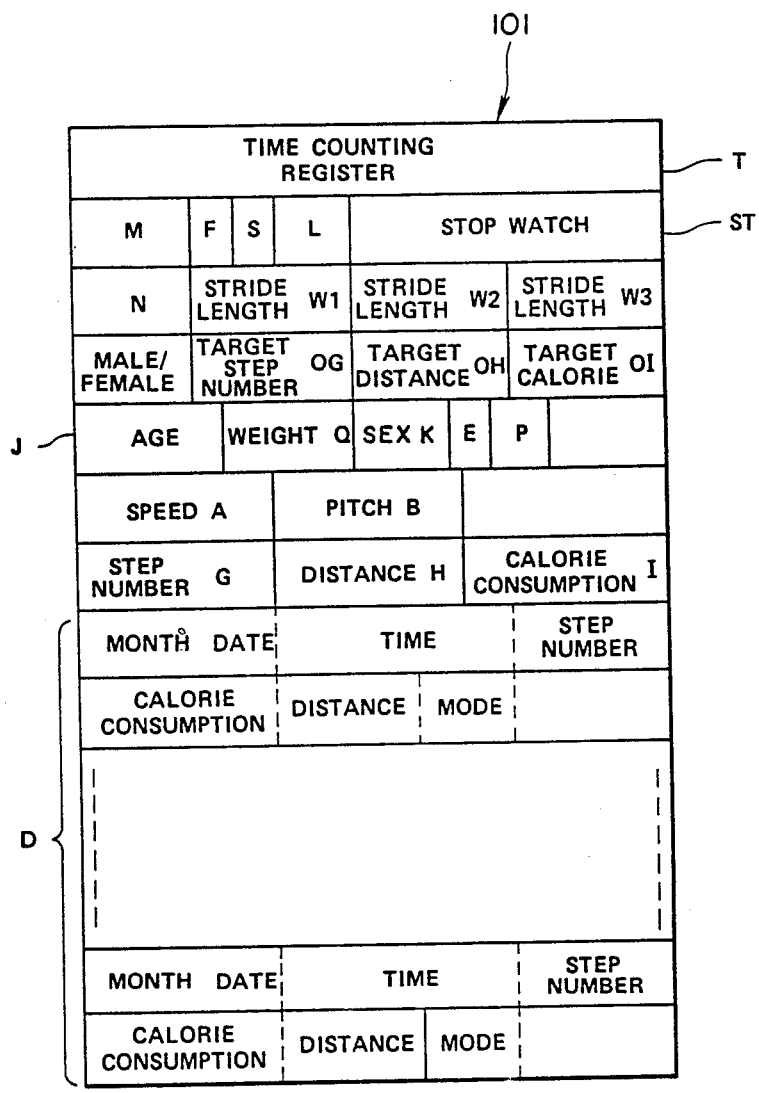
FIG. 15 is a view illustrating details of RAM 101 shown in FIG. 14.

FIG. 15 is a view showing the construction of the register of RAM 101. RAM 101 is provided with a time-counting register T for storing the present-time data and a mode register M for storing numbers corresponding to a display mode. In this mode register, $M=0$ is set when a time-display mode is selected, $M=1$ is set when a step-counting mode is selected, $M=2$ is set when a display-mode is selected for displaying number of steps, a distance-walked, a mean speed, calorie consumption, $M=3$ is set when a display-mode is selected for displaying various data of each date and $M=4$ is set when a data-setting mode is selected for setting stride-lengths, calorie consumption as a target, respectively.

A register F is a flag which is set at "1" in the data-setting mode, and a register S also is a flag which is set at "1" in the step-counting mode. A register L is a counter for designating items to be corrected, which counter is incremented every operation of the switch S1 in the data-setting mode ($M=4$).

A register ST serves as a register for storing a measurement time when a stop-watch measurement is effected. A register N serves as a register for storing numerals corresponding to the exercise mode set by the user, such as the walking mode, the exercise-walking mode or the jogging mode.

Stride-length registers W1, W2 and W3 are registers for storing stride-lengths set in the walking, exercise-walking or jogging mode, respectively. Registers OG, OH and OI serve to store a target number of steps, a target distance and target calorie consumption. Registers J, K and Q are registers for storing sex, age and weight respectively. Calorie consumed in exercising is calculated from the exercise mode and a time period for exercising on the basis of above-mentioned data.

A register E is a flag which is set at generation of a carry signal of every 10 seconds. Registers A and B are registers for storing walking speeds and walking pitches calculated from number of steps taken in a time period of 10 sec, respectively.

A step-register G, a distance-walked register H and a calorie-consumption register I are for storing accumulative number of steps taken, accumulative distance-walked and accumulative calorie-consumption which are under measurement, respectively.

In the present embodiment, counting of number of steps taken which is the fundamental of measurement is effected every ten seconds and the counter 48 of FIG. 14 receives step data to rewrite the above mentioned registers and the data obtained during the time period of 10 seconds are added to those stored in the step-register G, the distance-walked register H, the calorie-consumption register I, and thereby accumulation of number of steps taken and distance-walked is effected. Then the counter 48 is cleared.

RAM 101 is further provided with a data register D comprising a plurality of memory areas where counted data of each date such as a time duration of walking, number of steps taken, total calorie-consumption, exercising mode are stored when one measurement to be executed during a time period from the start to stop of the stop-watch counting is terminated. The data-register D has a memory area for storing date, into which area the date when the stop-watch starts its time-counting is written. A pointer P is a register which designates address of the counted data of each date which has been stored in the data-register D and is incremented by a switch operation as will be described below and then the counted data of the designated date is read out.

Figure 16:
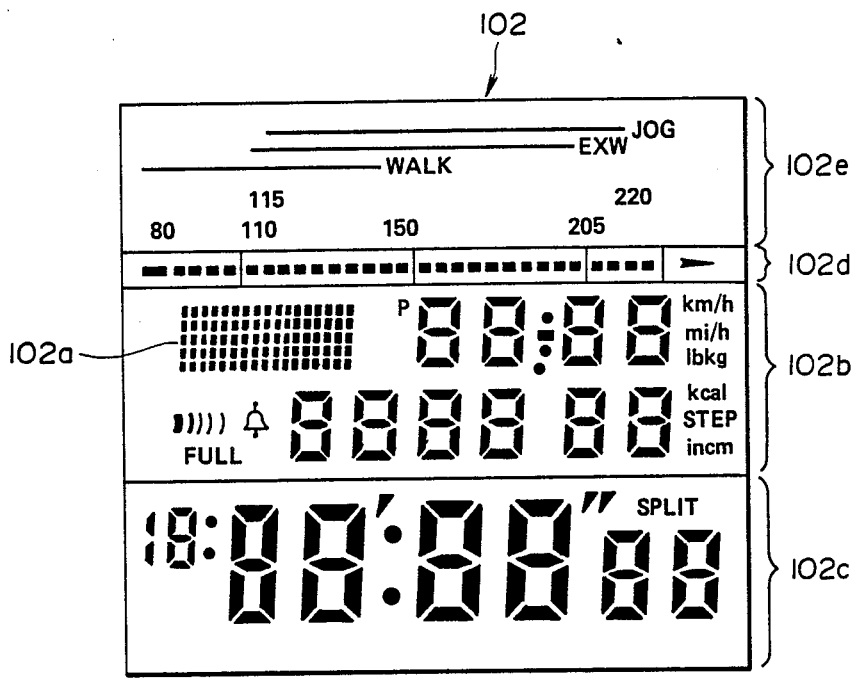
FIG. 16 is a view illustrating a construction of display electrodes of a display section 102 shown in FIG. 14.
Figure 17:
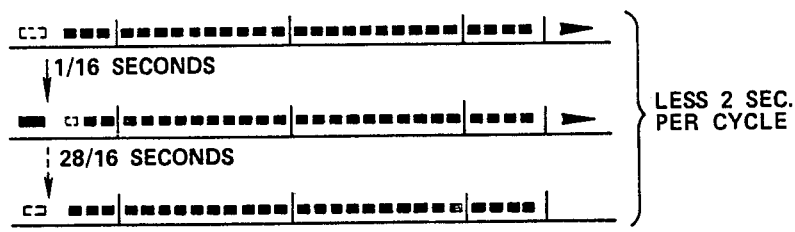
FIG. 17 is a view illustrating display states of display section 102d shown in FIG. 16.

FIG. 16 is a view illustrating display segments of the display section 102. At the middle portion of the display section 102 are disposed a dot-display section 102a for displaying characters and numerals and a segment-display section 102b for displaying dates and counted data. At the lower portion is disposed another segment-display section 102c for displaying time and time durations measured. A bar-display section 102d disposed at the upper portion of the display section 102 is to indicate whether or not counting of number of steps taken is going on. As shown in FIG. 17, while the above mentioned counting is going on, one of display members (indicated by a broken line) of the bar-display section 102d is put off and this display member being put off travels in the rightward direction at the period of 16 Hz. In this example, 28 units of display members are provided on the bar-display section 102d, so that the display member being put off travels from the left end to the right end in 18/16 sec.

In this manner, since display state of the bar-display section 102d changes at a relatively short period, it can be instantly recognized whether or not the counting is going on at a sight of the bar-display section 102d, even when time is displayed on the display sections 102b and 102c and it is hard to recognize from the display of the display sections 102b and 102c that the counting is going on.

Therefore, the battery is prevented from being consumed in vain while the instrument is not turned off and is left turned on to operate. At the upper side of the bar-display section 102d is provided a printed display section 102e which clearly indicates in print "80 to 150 steps per minute in walking", "110 to 205 steps per minute in exercise walking" and "110 to 205 steps per minute in jogging".

Referring to a flow chart shown in FIG. 18, main process of the embodiment constructed as mentioned above will be described. The system is normally at a halt state of Step $a_1$ of FIG. 18. When an interruption of time counting is detected, the process advances to Step $a_2$ to effect a time-counting process in unit of 10 sec or less with respect to the present time. In the time-counting process of 10 sec or less, a time-counting signal of 16 Hz is counted. As the result, when a time period of 10 sec has lapsed, it is discriminated at Step $a_3$ that a carry of 20 sec is established and the process advances to Step $a_4$ At Step $a_4$, it is discriminated if a flag S is "1", which indicates whether a stop-watch measurement is going on or not. If S=1, i.e. if the measurement is started and the 10 sec-carry is generated, then "1" is set to the register E at Step $a_5$ to store a timing at which data are taken in every ten seconds. At Step $a_6$, a renewal of the present time is executed every 10 seconds or more.

Figure 19:
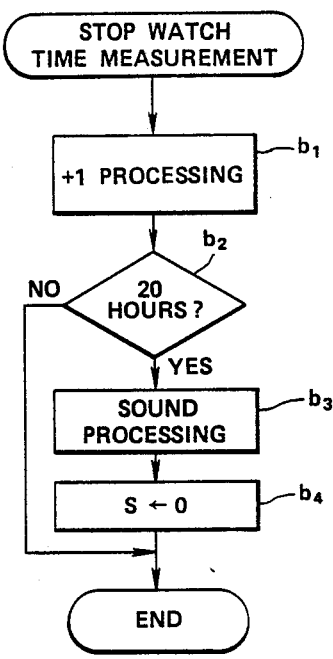

When the time-counting process of 10 seconds or more has been completed, or when no measurement is going on and no 10-sec carry signal is generated, then the process advances to Step $a_7$. At Step $a_7$, it is discriminated again if the flag S is "1", and if S=1, a stop-watch time-counting process is executed at Step $a_8$. FIG. 19 is a chart showing the details of the stop-watch time-counting process $a_8$. At step $b_1$, the stop-watch register St is incremented to renew the measurement time. At Step $b_2$, it is discriminated whether or not 20 hours have lapsed since the start of the measurement and if 20 hours have lapsed, a signal is outputted to the alarm-driving section 103 of FIG. 14 at Step $b_3$ in order to cause the buzzer 104 to generate an alarm. At the following Step $b_4$, the flag S is set at "0" and causes the measurement to terminate.

Figure 18:
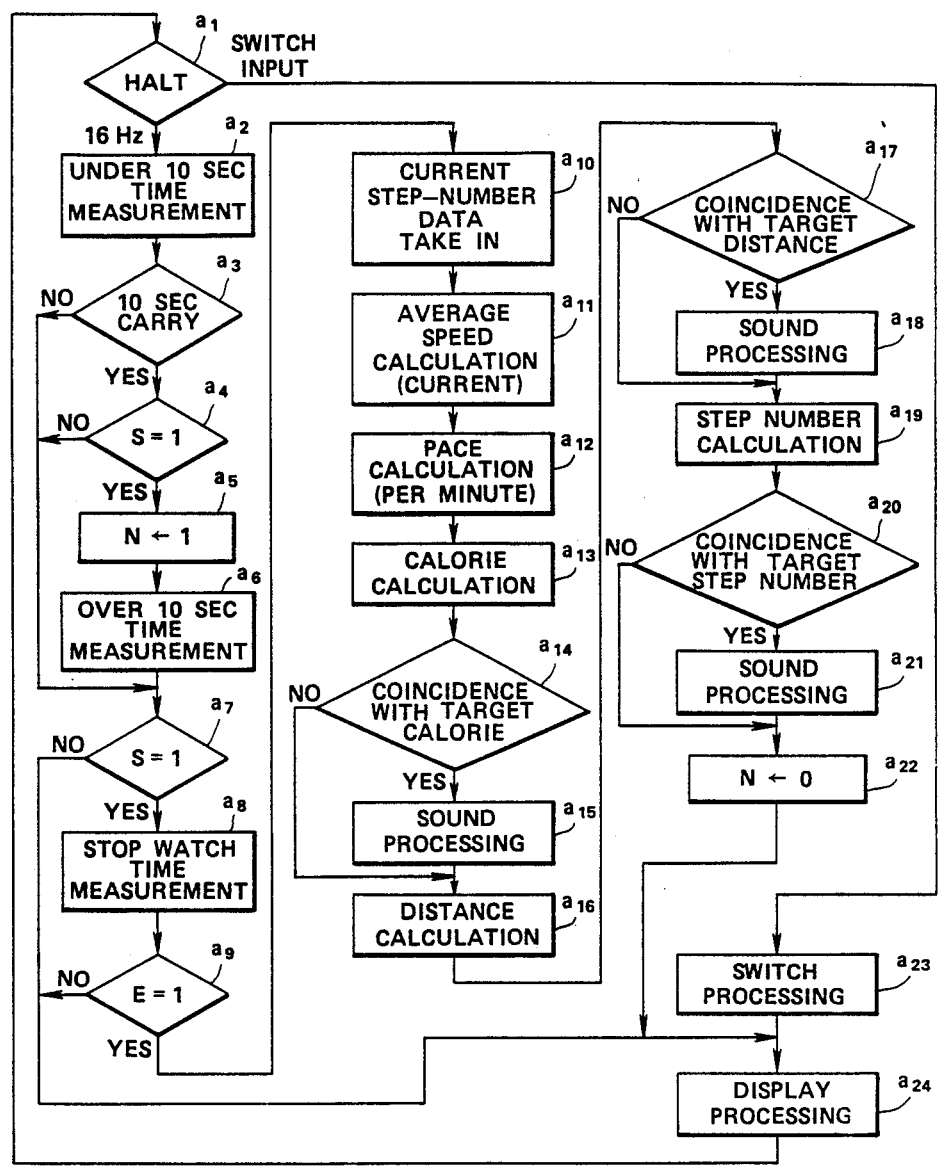
FIGS. 18, 19 and 20 are flow charts of circuits shown in FIG. 14.

When the stop-watch time-counting process of Step $a_8$ has been terminated, the process advances to Step $a_9$ of FIG. 18. At Step $a_9$, it is discriminated if the register E has been set at "1", and if E=1. Then step data of 10 sec at the counter 48 is taken in at Step $a_{10}$. In the same manner, at Step $a_{11}$, a mean walking speed during a time period of 10 sec is calculated from the stride-length corresponding to the exercise mode (one data of stride-length data stored in the stride-length registers W1, W2 and W3) and the number of steps taken during the above time period of 10 sec and then the mean walking speed is stored at the register A of RAM 101. And at Step $a_{12}$, pitches per minute (number of steps/minute) are calculated from number of steps taken during the time period of 10 sec and are stored at the register B of RAM 101.

After taking in data obtained every 10 seconds, at the following Step $a_{13}$ calorie consumption in exercise is calculated from data such as a time lapse from the start of measurement, the exercise mode, sex, age and weight of the exerciser. The calculated calorie consumption is stored at the calorie-consumption register I of RAM 101. At Step $a_{14}$, it is discriminated whether or not the above mentioned calorie consumption I has reached the target calorie consumption 0I which has previously been set and if the calorie consumption I has reached the target calorie consumption I0, an alarm sound is generated at the next Step $a_{15}$, informing that the above mentioned target calorie has been consumed. After the discrimination at Step $a_{14}$ and the generation of the alarm at Step $a_{15}$, distance-walked during every time period of 10 sec. are calculated from the stride length and the number of steps taken and are added to the value stored in the distance-walked register H of RAM 101 and the sum is again stored at the distance-walked register H at Step $a_{16}$. Then it is discriminated whether or not the distance-walked has reached the target distance OH at Step $a_{17}$ and if the distance-walked has not reached the target distance OH, the process advances to Step $a_{19}$ and if the distance-walked has reached the target distance OH, the alarm process is effected at Step $a_{18}$, generating the alarm sound.

After Step $a_{17}$ or $a_{18}$, the process advances to Step $a_{19}$, where number of steps taken in every 10 seconds is added to the value of the step register G to obtain the accumulative number of steps taken. At Step $a_{20}$, it is discriminated whether or not the accumulative number of steps has reached the target number of steps OG. If not, the process advances to Step $a_{22}$ If the above accumulative number of steps has reached the target number of steps OG, the alarm sound is generated at Step $a_{21}$ The data counted every 10 seconds has been renewed in the above mentioned processes and then "0" is set to the register E at Step $a_{22}$ to prepare for the following counting after a lapse of 10 seconds. And at the same time, the counter 48 is cleared. At Step $a_{24}$, display operation is executed in accordance with the value of the mode register M, that is, for example, when M=0, the present time is displayed, when M=1, various data obtained in the step-counting mode are displayed, and when M=2, the distance-walked, the mean speed, the calorie consumption and the like are displayed. And when M=3, the contents of the register D are displayed and when M=4, various set-data are displayed, which will be described in detail later.

In the meantime, when a switch has been operated at Step $a_1$, it is discriminated that a switch-interruption has been caused and the process advances to Step $a_{23}$ where a switch-processing is to be executed.

Now, referring to a flow-chart illustrated in FIG. 20 and examples of displays shown in FIGS. 21 to 23, the detail of the above mentioned switch-processing at Step $a_{23}$ will be described hereinafter.

Figure 20:
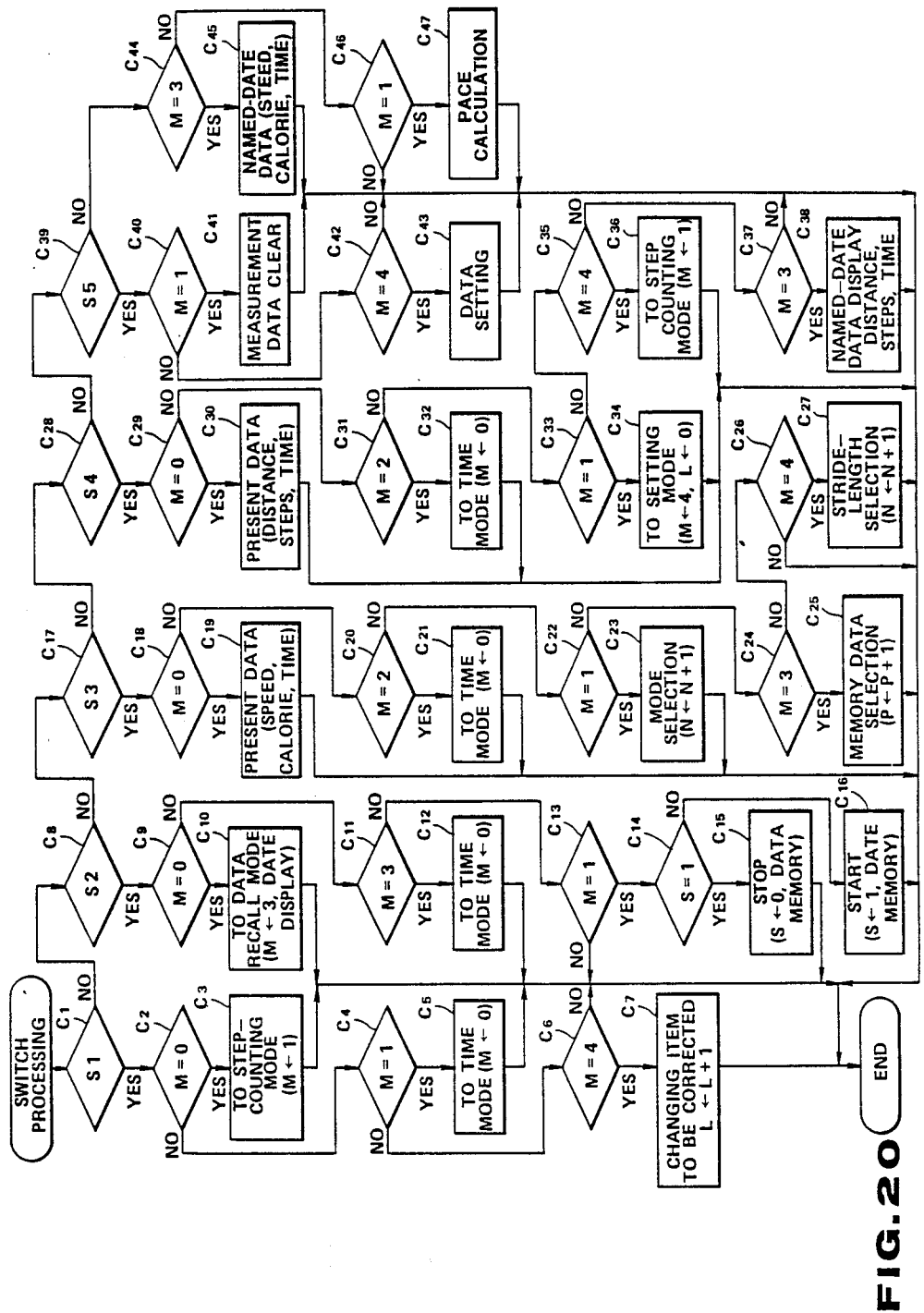

In FIG. 20, it is discriminated if the switch S1 has been operated at Step $c_1$. When the switch S1 has been operated, it is discriminated if the mode register M has been set at a value of "0", and when M=0, that is, when the switch S1 has been operated in the time-display mode. The register M has been set at "1" and thereby the mode is switched to the step-counting mode.

When M=0 is not discriminated at Step $c_2$, it is discriminated whether or not the register M has been set at a value "1". When M=1, i.e., when the switch S1 has been operated in the step-counting mode (M=1), a value "0" has been set to the register M and thereby the mode is switched to the time-display mode. That is, when M=0, the contents of the time-counting register T of RAM 101, i.e., the present time (Oct. 30, 1988, Sunday, 58 minutes and 50 seconds past 10 o'clock p.m.) are displayed as shown at A in FIG. 21. When M=0 has been changed to M=1 by operation of the switch S1, characters are displayed as shown at B in FIG. 21, which characters indicate which type of exercises is selected, walking (WLK), exercise walking (EXW) or Jogging (JOG), in accordance with the contents of the stop-watch register ST, the step-register G, the distance register H and the register N.

Figure 21:
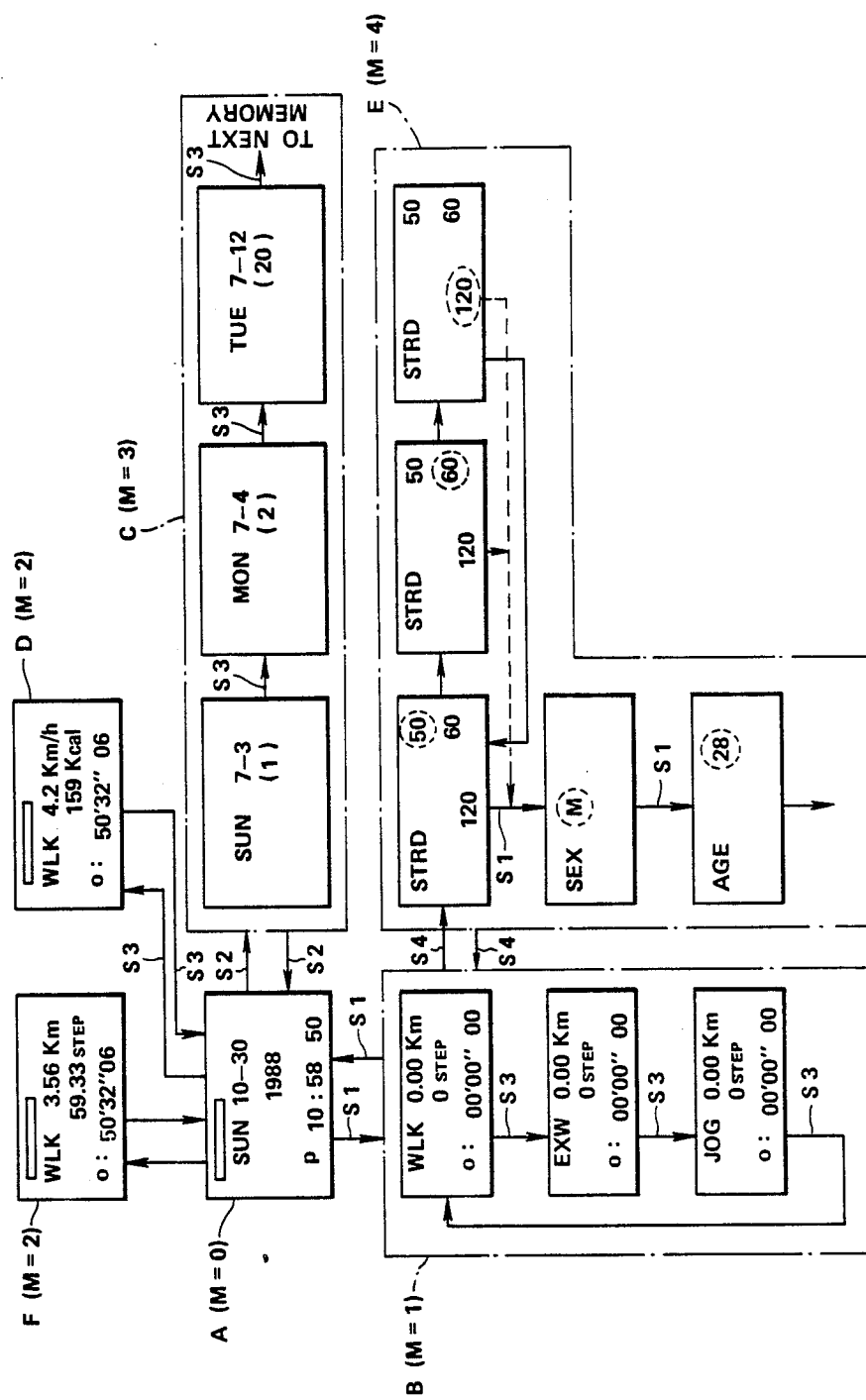
FIGS. 21, 22 and 23 are views illustrating changes in display states of the display section.

Any of the exercises, i.e., walking, exercise walking or jogging is selected by operation of switch S3, as shown in FIG. 21, which will be described in detail later.

Returning to FIG. 20, if M=1 is not discriminated at Step $c_4$, it is discriminated at Step $c_6$, if M=4 is established. When M=4, i.e., when the switch S1 has been operated in the data-setting mode, a register L which designates an item to be corrected is incremented, thereby changing the item to 6e corrected to the following data.

If the switch S1 has not been operated at Step $c_1$, then the process advances to Step $c_3$ where it is discriminated if the switch S2 has been operated. If the switch S2 has been operated, then the process advances to Step $c_9$ where it is discriminated if the mode-register M has been set at a value "0". When M=0, i.e., when the switch S2 has been operated in the time-display mode, a value "3" is set to the register M at Step $c_{10}$ and the mode is switched to a data-recall-mode (M=3) in which data of each date is read out from the data-register D.

If M=0 is not discriminated at the Step $c_9$, the process advances to Step $c_{11}$ where it is discriminated if the register M has been set to "3". When M=3, i.e., when the switch S2 has been operated in the data-recall mode, a value "0" is set to the register M and thereby the mode is switched to the time-display mode.

Accordingly, operation of the switch S2 allows to switch the mode from the time-display mode shown at A in FIG. 21 to the data-recall mode (M=3) shown at C in FIG. 21 and to switch the mode in the reverse direction.

Furthermore, if M=3 is not discriminated at Step $c_{11}$, the process advances to Step $c_{13}$ where it is discriminated if the value of the register M is "1". When M=1, it is discriminated if a counting flag S is "1" at Step $c_{13}$. If S=1, the counting flag S is reset to "0" at Step $c_{15}$ and the measurement is stopped. On the other hand, when the counting flag is not "1", the value "1" is set to the flag S and thereby a counting of steps is caused to start. That is, in the step-counting mode (M=1), the switch S2 functions to start and/or stop the step-counting operation.

Mode selection by operation of the switch S2 will be described referring to FIG. 22.

Figures 22, 23:
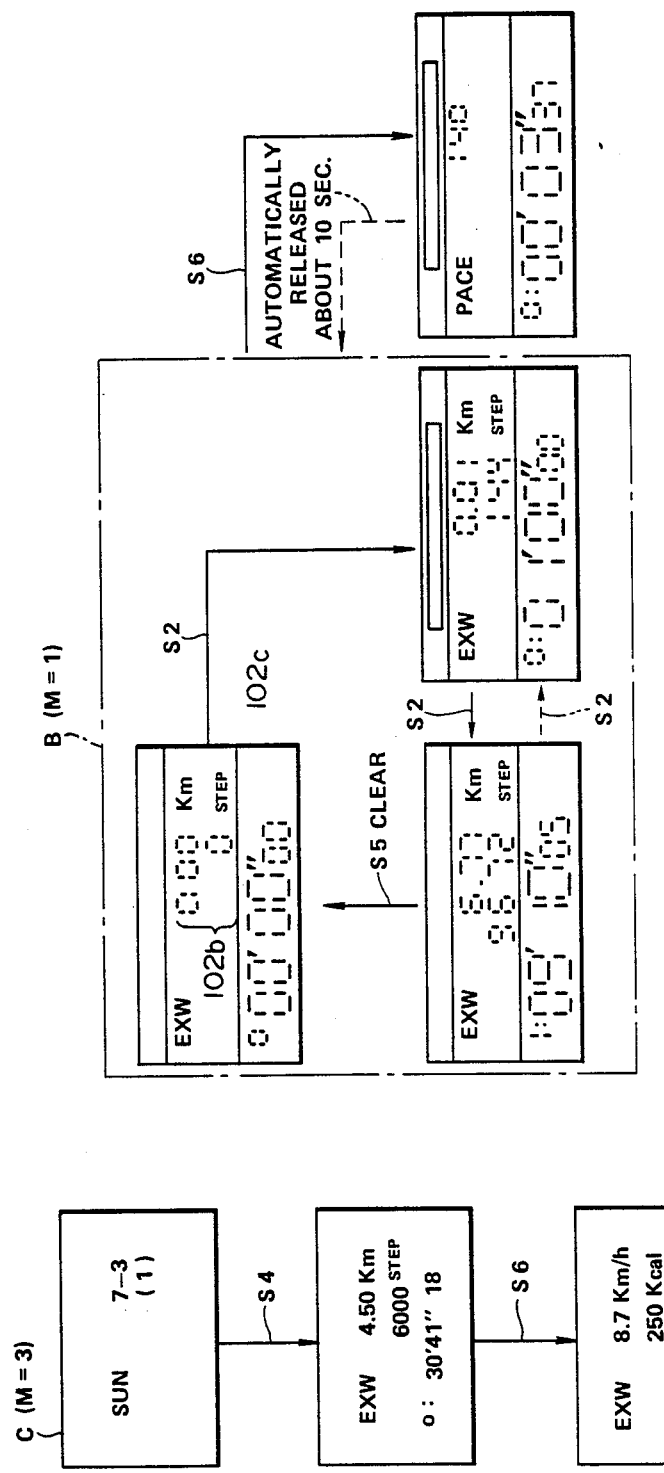

FIG. 22 is a view illustrating an example of indication which is displayed when the exercise walking is selected as the exercise mode and the measurement is started, stopped or cleared. "0"s are displayed as data of the stop-watch register ST on the display section 102c in the initial condition and when the switch S2 is operated to start the measurement, counted data of the register ST are displayed at the display section 102c and at the same time data of the step-register G and the distance register M which are sequentially renewed every 10 seconds are displayed at the display section 102b. When the switch S2 is operated again under this condition, the measurement is stopped and the final results of the measurement are displayed. In FIG. 22, the indication the right within the frame of a broken line indicates data under measurement and the display members of the bar display section 102d are lighted and at the same time one of the display members which is not lighted travels in the rightward direction at a relatively short period, thereby indicating that the measurement is going on. Indication on the left side where the bar display section 102d is not lighted indicates the final data of the measurement. When a clear switch S5 to be described later is operated at the termination of the measurement, the data indication is reset to "0".

If it is discriminated at Step $c_8$ that the switch S2 has not been operated, then the process advances to Step $c_{17}$, where it is discriminated if the switch S3 has been operated. If the switch S3 has been operated, the process advances to Step $c_{18}$, where it is discriminated if the mode register has been set at "0". If M=0, "2" is set to the register M at Step $c_{19}$ and at the same time a mean speed is calculated from the time period of measurement and the data stored at the distance register H of RAM 24 and then the calculated mean speed and data stored at the calorie-consumption register I and the measurement-time register ST are displayed as shown at D in FIG. 21. If it is not discriminated at the Step $c_{18}$ that M=0 has not been established, the process advances to Step $c_{20}$, where it is discriminated if the register M has been set at "2". If M=2, then "0" is set to the register M and the mode is switched to the time-display mode.

If it is discriminated at Step $c_{20}$ that M=2 has not been established, then the process advances to Step $c_{22}$ where it is discriminated if M=1 has been established. When M=1, i.e. when the switch S3 has been operated in the step-counting mode, the register N which indicates the exercise mode is sequentially incremented to sequentially select the exercise mode such as the walking mode, the exercise walking mode and the jogging mode.

If it is discriminated at Step $c_{22}$ that M=2 has not been established, the process advances to Step $c_{24}$ where it is discriminated if M=3 has been established. If M=3, the pointer P is incremented at Step $c_{25}$ to renew the address for reading the data-register D. If it is discriminated at Step $c_{24}$ that M=3 has not been established, it is discriminated at Step $c_{26}$ if M=4 has been established. If M=4, then the number of the register N is incremented at Step $c_{27}$. That is, in the data-setting mode (M=-4), the switch S3 is a switch which serves to decide which one of the stride-lengths of the exercise modes such as exercise walking and jogging is to be set, and one of stride-lengths of three exercise-modes can be set by operation of the switch S3.

Operations of the above mentioned switches S1 and S3 will be described which set sex and age of the exerciser, a target number of steps and a stride-length.

First, the time-displaying mode shown at A in FIG. 21 is switched to the step-counting mode shown at B in FIG. 21 by operation of the switch S1 and then when the switch S4, as will be described, is operated, the mode is switched to the data-setting mode shown at E in FIG. 21. Immediately after the data-setting mode has been set, the characters "STRD" are displayed at the display section 102a and the content of the step register W1, i.e., the stride-length corresponding to the walking mode, for example, "50" is displayed in a blinking fashion at the upper portion of the display-section 102b.

The above mentioned examples of displays illustrate display states which are shown when stride-lengths for three exercise modes have been set. When a number-setting switch to be described later is operated while the stride-length is displayed in a blinking fashion, a stride-length to be taken in walking can be automatically set. When the switch S3 is operated in this condition, the data of the stride-length register W2, i.e., the stride-length, "60", corresponding to the exercise walking is displayed in a blinking fashion, which data has been displayed at a lower portion of the display section 102b. And when the switch S3 is operated again, the content of the stride-length register W3, i.e., the stride-length, "120", corresponding to the jogging, which stride-length has been displayed at the display section 102c is displayed in a blinking fashion. The stride-length corresponding to each of the exercise modes can be set by operation of the number-setting switch during the blinking state of the display.

Accordingly, when an exercise mode is switched to other exercise mode, for example, from the walking mode to the exercise walking mode after the completion of measurement for walking, the setting operation of the stride-length is not required every time the exercise mode is switched. Only the switching operation of the exercise mode is required, so that the pedometer can be easily operated.

When the switch S1 is operated in the above-mentioned setting state of the stride-length, the process of Step $c_7$ changes the item to be corrected, thereby causing to display the data-setting column of sex in a blinking fashion. When the switch S1 is operated in this state again, the data-setting column of age is displayed in a blinking fashion. And thereafter, the setting columns of the target number of steps and the target calorie consumption which can be set every operation of the switch S1 are sequentially displayed in a blinking fashion and thereby the respective data can be set.

In FIG. 20, if it is discriminated at Step $c_{17}$ that the switch S3 has not been operated, then the process advances to Step $c_{28}$ where it is discriminated if the switch S4 has been operated. When the switch S4 has been operated, it is discriminated at Step $c_{29}$ if the value of the mode register M has been set to "0". If M=0, then the value "Z" is set to the mode register M at the following Step $c_{30}$ and the process advances to the display mode to display a distance and number of steps taken under measurement. In the display mode, the data of the step register G, the distance register H and the stopwatch register ST are displayed as shown at F in FIG. 21.

When it is discriminated at Step $c_{29}$ that M=0 has not been established, the process advances to Step $c_{31}$ where it is discriminated if the value of the mode register M has been set to "2". If M=2, then the value "0" is set to the mode register M and the mode is switched from the display mode in which the present data are displayed to the time display mode.

That is, the mode can be switched by operation of the switch S3 or S4 from the time display mode to the display mode in which the present data are displayed such as a walking speed, calorie consumption, a distance-walked and number of steps taken, all of which are under measurement. And also the mode can be switched from the display mode to the time-display mode in the similar manner.

If it is discriminated at Step $c_{31}$ of FIG. 20 that M=2 has not been set, then the process advances to Step $c_{33}$ where it is discriminated if the value of the register M has been set to "1". If M=1, the value "4" is set to the mode register M and the mode is switched to the data-setting mode shown at E in FIG. 21 and at the same time the register L which designates an item to be corrected is initialized.

Furthermore, if it is discriminated at Step $c_{33}$ that M=1 has not been set, it is discriminated at Step $c_{35}$ if M=4 has been set. If M=4, then the value "1" is set to the mode register M and the mode is switched to the step mode.

That is, the step mode (M=1) and the data-setting mode (M=4) can be alternatively switched by operation of the switch S4.

If it is discriminated at Step $c_{35}$ that M=4 has not been set, the process advances to Step $c_{37}$ where it is discriminated if M=3 has been set. When the switch S4 has been operated in the data-recall mode of M=3, measured data of the date selected at the time, such as a distance-walked and number of steps taken are read out and displayed at Step $c_{38}$.

If it is discriminated at Step $c_{28}$ that the switch S4 has not been operated, the process advances to Step $c_{39}$ where it is discriminated if the switch S5 has been operated. If the switch S5 has been operated, it is discriminated if the value of the mode register M has been set to "1". If M=1, data stored at the registers G, H and I are cleared at Step $c_{41}$.

If it is discriminated at Step $c_{40}$ that M=1 has not been set, then it is discriminated at Step $c_{42}$ if M=4 has been set. When M=4, i.e., when the switch S5 has been operated in the data-setting mode, the switch S5 serves as a setting switch of characters and numerals and is capable of setting desired characters and numerals at the columns which are selected by operation of the switch S1 or S3.

If it is discriminated at Step $c_{39}$ that the switch S5 has not been operated, it is discriminated that the switch S6 has been operated and the process advances to Step $c_{44}$. At Step $c_{44}$ it is discriminated if the value "3" has been set to the mode register M. If M=3, a mean speed, calorie consumption and a time-period of measurement are displayed as the measured data of the date which is designated by the pointer P.

If it is discriminated at Step $c_{44}$ that M=3 has not been set, then the process advances to Step $c_{46}$ where it is discriminated if M=1 has been set. When M=1, i.e., when the switch S6 has been operated in the step mode, a pace (a pitch) taken at the time is displayed as shown in FIG. 22. This pace display returns to the step mode after a time lapse of approximately 10 seconds, so that operation of the switch S6, for example, in exercise walking allows the walking pace to be displayed.

Accordingly, the user of the pedometer can confirm whether or not his or her own walking pace is kept in the range of the pace which has been previously set for walking, exercise walking or jogging.

An operation will be described which is executed to display the measured data of each date which data are stored at the data register D. FIG. 23 is a view illustrating an example of the operation which is executed to display the measured data, "July 3, Sunday" among a plurality of data stored at the data register D. After the mode is switched to the data-recall mode (M=3) and the date is selected, the switch S4 is operated. Then, a distance-walked 4.50 km, number of steps taken, 6000 STEP, a time period-walked 30 minutes 41 seconds and 18, as well as characters "EXW" are displayed and these data are recognized by the user as the measured data in exercise walking. When the switch S6 is operated in this state, other data measured in the exercise walking such as a mean walking-speed, 8.7 km/h, calorie consumption, 250 kcal and the same time period-walked, 30 minutes 41 seconds and 48 are displayed.

While the invention has been described with reference to various preferred embodiments thereof, it will be understood by those skilled in the art that an exercise-measuring instrument according to the invention is not limited to the described embodiments but numerous changes and modifications in form and detail may be made. For example, since various data such as data measured with a stop watch, step data, distance data, calorie consumption have been arranged to be displayed on a display device but these data may be acoustically announced every operation of a switch which is provided in the instrument so as to cooperate with a voice composing circuit.

The instrument combined with a wrist watch has been described, but it will be apparent that the instrument way be made for an exclusive use or may be combined with other devices, for example, such as a small-size electronic calculator, an electronic pocket directory and the like.

What is claimed is:

1. An exercising measuring instrument, comprising:
acceleration sensor means to be worn on a body of an exerciser, for outputting a waveform signal representative of acceleration which is received by said acceleration sensor means in response to movements of said exerciser;
amplifying means coupled to said acceleration sensor means, for amplifying said waveform signal outputted from said acceleration sensor means;
manually operable switching means for selecting one exercise mode out of a plurality of exercise modes, each exercising mode representing a form of an exercise performed by said exerciser;
amplifier-gain control means coupled to said manually operable switching means, for varying the amplifier-gain of said amplifying means in accordance with the exercise mode selected by said manually operable switching means;
exercise-measuring means for measuring exercise data in said selected exercise mode on the basis of said waveform signal amplified by said amplifying means; and
announcing means for announcing the exercise data measured by said exercise-measuring means.

2. An instrument as claimed claim 1 wherein said acceleration sensor comprises a sensor case and a piezoelectric piece received in said sensor case, on which piezoelectric piece a plurality of piezoelectric elements are stuck.

3. An instrument as claimed in claim 1, wherein said manually operable switching means includes memory means for storing one exercise mode data out of at least a walking mode, an exercise-walking mode and a jogging mode.

4. An instrument as claimed in claim 1, wherein:
said manually operable switching means comprises memory circuit means for storing one exercise mode data out of at least a walking mode, an exercise-walking mode and a jogging mode;
said amplifier-gain control means is coupled to said memory circuit means; and
said amplifier-gain control means includes means for controlling said amplifier gain such that said amplifier gain is decided depending on the selected one of the walking mode, exercise-walking mode and jogging mode, and becomes lower in the walking mode, medium in the exercise-walking and higher in the jogging mode.

5. An instrument as claimed in claim 1 wherein said exercise-measuring means comprises a waveform-shaping means for shaping the waveform of said amplified signal by said amplifying means and a counting means for counting the signal delivered from said waveform-shaping means, and announcing means for announcing step-number data obtained on the basis of contents of said counting means.

6. An instrument as claimed in claim 5 wherein said announcing means has a display means for displaying said step-number data as an exercise amount.

7. An instrument as claimed in claim 6 wherein said displaying means comprises a liquid crystal display device which displays data in a digital fashion.

8. An instrument as claimed in claim 5 further comprising stride-length memory means for storing stride-length data; and
distance-data calculating means for calculating distance data from the stride-length data stored at said stride-length memory means and the contents of said counting means.

9. An instrument as claimed in claim 1 wherein said amplifying means comprises an operational amplifier and said amplifier-gain control means controls the amplifier gain by switching resistances connected to an input terminal of said operational amplifier.

10. An exercise measuring instrument comprising:
an acceleration sensor to be worn on a body of an exerciser, for outputting a waveform signal representative of acceleration which is received by said acceleration sensor while said exerciser is stepping;
amplifying means coupled to said acceleration sensor, for amplifying said waveform signal outputted from said acceleration sensor;
counting means for counting the signal delivered from said amplifying means;
count-prohibiting means for prohibiting said counting means from counting for a predetermined time period after the counting by said counting means, and causing said counting means to count "1" every two steps;
calculating means for doubling the number counted by said counting means; and
announcing means for announcing data of said calculation result as the step-number data.

11. An instrument as claimed in claim 10 wherein said acceleration sensor comprises a sensor case, and
a piezoelectric piece received in said sensor case, on which piezoelectric piece a plurality of piezoelectric elements are stuck.

12. An instrument as claimed in claim 10 wherein said counting means comprises a first counting means for counting the signal delivered from said amplifying means and an accumulative memory means for accumulating a number counted by said counting means and for storing said accumulated number.

13. An instrument as claimed in claim 12 wherein said first counting means is cleared after said accumulative memory means has stored said accumulated number.

14. An instrument as claimed in claim 10 wherein said count-prohibiting means includes a prohibiting circuit which causes said counting means to count "1" every two steps taken by said exerciser.

15. An instrument as claimed in claim 10 further comprising selecting means for selecting one exercise mode out of a plurality of exercise modes, wherein said count-prohibiting means controls a time duration, during which the counting means is prohibited from counting, in accordance with the exercise mode selected by said selecting means.

16. An instrument as claimed in claim 10 wherein said counting means comprises a first counting means for counting a signal delivered from said amplifying means and an accumulative memory means for sequentially accumulating numbers outputted from said first counting means and for storing said accumulated number, and said calculating means obtains step-number data by doubling said accumulated number.

17. An instrument as claimed in claim 10 further comprising selecting means for selecting one exercise mode out of a plurality of exercise modes, and amplifier-gain control means for controlling the gain of said amplifying means in accordance with the exercise mode selected by said selecting means.

18. An instrument as claimed in claim 10 further comprising stride-length data memory means for storing stride-length data, and multiplication means for obtaining distance-walked data by multiplying the stride-length data and the product data obtained by said calculating means, said stride-length data being stored at said stride-length data memory means.

19. An instrument as claimed in claim 17 wherein said selecting means includes means for selecting one mode out of a walking mode, an exercise-walking mode and a jogging mode.

20. An exercise measuring instrument comprising:
sensor means to be worn on a body of an exerciser, for outputting a waveform signal by detecting the occurrence of a step of said exerciser;
time-measuring means for measuring time on the basis of a start/stop instruction to obtain time data;
first display means for displaying the time data obtained by said time-measuring means;
step-number counting means for counting said waveform signal delivered from said sensor means for a time period, during which said time-measuring means is executing its time-measurement, thereby obtaining step-number data;
second display means for displaying said step-number data obtained by said step-number counting means;
stride-length data memory means for storing stride-length data;
distance data calculating means for calculating distance-data from the stride-length data and the step-number data, said stride-length data being stored in said stride-length data memory means and said step-number data being obtained by said step-number counting means;
third display means for displaying said distance data obtained by said distance-data calculating means; and
data memory means for storing said step-number data, said distance data and time data which has been measured by said time-measuring means at the time when said time-measuring means stops its time-measurement on the basis of said start/stop instruction; and
fourth display means for displaying said step-number data, distance data and time data which are stored in said data memory means.

21. An instrument as claimed in claim 20 wherein respective stride-length data corresponding to a plurality of exercise modes can be set to said stride-length data memory means, and said data memory means includes a memory area for storing data which indicate in which exercise mode among said plurality of exercise modes the time data, the step-number data and the distance data have been obtained.

22. An instrument as claimed in claim 20 further comprising announcing means for announcing that said time-measuring means is effecting its time-measurement.

23. An instrument as claimed in claim 20 wherein announcing means visually announces by means of a display device.

24. An instrument as claimed in claim 22 wherein said announcing means acoustically announces by means of a sounding device.

25. An instrument as claimed in claim 20 further comprising an auto-stop means for causing said time-measuring means to automatically stop its time-measurement at the time when said time data obtained by said time-measuring means has reached a predetermined time.

26. An exercise measuring instrument comprising:
time-counting means for counting a reference signal, thereby obtaining the present-date data and the present-time data;
an acceleration sensor for outputting an acceleration signal in response to movements of an exerciser;
amplifying means for amplifying said acceleration signal outputted from said acceleration sensor;
selecting means for selecting one exercise mode out of a plurality of exercise modes which indicate forms of exercise performed by said exerciser;
amplifier-gain control means connected to said selecting means, for varying the gain of said amplifying means in accordance with said selected exercise mode;
exercise-measuring means for measuring exercise-amount data in the exercise mode selected by said selecting means on the basis of the signal amplified by said amplifying means;
date and exercise-amount data memory means for storing the exercise-amount data together with the date data obtained by said time-counting means, said exercise-amount data being obtained by said exercise-measuring means; and
display means for displaying the data stored at said date and exercise-amount data memory means.

27. An instrument as claimed in claim 26 wherein said acceleration sensor comprises a sensor case and a piezoelectric piece received in said sensor case, on which piezoelectric piece a plurality of piezoelectric elements are attached.

28. An instrument as claimed, in claim 26 wherein said selecting means has a selecting switch for selecting one exercise mode out of three exercise modes including a walking mode, an exercise-walking mode and a jogging mode.

29. An instrument as claimed in claim 26 wherein said selecting means comprises a selecting circuit for selecting one exercise mode out of at least three exercise modes including a walking mode, an exercise-walking mode and a jogging mode and said amplifier-gain control means is connected to said selecting means and controls the gain of said amplifying means such that said gain of said amplifying means becomes higher in the order of the walking mode, the exercise-walking mode and the jogging mode.

30. An instrument as claimed in claim 26 wherein said date and exercise-amount data memory means has a memory area for storing a plurality of date data and exercise-amount data.

31. An instrument as claimed in claim 26 wherein said data and exercise-amount data memory means has a memory area for storing the exercise mode selected by said selecting means.

32. An instrument as claimed in claim 26 received in a wrist watch case.

33. An exercise measuring instrument, comprising:
a plurality of stride-length data memory means for storing different stride-length data;
selection switch means for selecting one memory means out of said plurality of stride-length data memory means;
sensor means adapted to be worn on an exerciser's body for detecting steps taken by the exerciser;

amplifying means coupled to said sensor means for outputting a waveform signal representing the detected steps;

amplifier-gain control means for controlling the gain of said amplifying means in accordance with the selection of a memory means by said selection switch means;

step counting means for counting the waveform signal output from said amplifying means to obtain step number data;

calculating means for performing operations on stride-length data and the step number data obtained by said step counting means so as to obtain distance, said stride-length data being stored in the memory means selected by said selection switch means; and display means for displaying the distance data obtained by said calculating means.

34. An instrument as claimed in claim 31 wherein said plurality of step-length data memory means comprise a first memory means for storing walking-stride-length data, a second memory means for storing exercise-walking stride-length data and a third memory means for storing jogging-stride-length data.

* * * * *

UNITED STATES PATENT AND TRADEMARK OFFICE
CERTIFICATE OF CORRECTION

PATENT NO. : 4,962,469
DATED : October 9, 1990
INVENTOR(S) : ONO et al

It is certified that error appears in the above-identified patent and that said Letters Patent is hereby corrected as shown below:

Title page, Section [56] References Cited, under "U.S. PATENT DOCUMENTS":

4,387,437 Lowrey et al - change "235/105" to --364/561--.

Column 23, claim 23 (line 1):

Change "claim 20" to --claim 22--.

Column 26, claim 34 (line 1):

Change "in claim 31" to --in claim 33--.

Signed and Sealed this

First Day of December, 1992

Attest:

DOUGLAS B. COMER

*Attesting Officer*     *Acting Commissioner of Patents and Trademarks*